US011930792B2

(12) United States Patent
Assuncao

(10) Patent No.: US 11,930,792 B2
(45) Date of Patent: Mar. 19, 2024

(54) MODULE FOR OPERATIONAL CONTROL OF THE GUIDED ADVANCE/WITHDRAWAL DEVICE OF THE NEEDLE ADDED TO THE SMART SUBSTANCE INJECTION DEVICE ON BOARD EQUIPMENT FOR INOCULATING SUBSTANCES INSIDE A FERTILE EGG AND SMART METHOD FOR INJECTION INSIDE A FERTILE EGG

(71) Applicant: PAS REFORM B.V., Ch Zeddam (NL)

(72) Inventor: Hernani Telles Assuncao, Santa Barbara d'Oeste (BR)

(73) Assignee: PAS REFORM B.V., Ch Zeddam (NL)

( * ) Notice: Subject to any disclaimer, the term of this patent is extended or adjusted under 35 U.S.C. 154(b) by 932 days.

(21) Appl. No.: 16/760,143

(22) PCT Filed: Sep. 17, 2018

(86) PCT No.: PCT/BR2018/050342
§ 371 (c)(1),
(2) Date: Apr. 29, 2020

(87) PCT Pub. No.: WO2019/084642
PCT Pub. Date: May 9, 2019

(65) Prior Publication Data
US 2021/0368744 A1    Dec. 2, 2021

(30) Foreign Application Priority Data

Oct. 31, 2017  (BR) ...................... 10 2017 023563 7
May 2, 2018   (BR) ...................... 13 2018 008855 5

(51) Int. Cl.
*A01K 45/00*     (2006.01)
*A61D 1/02*      (2006.01)
(Continued)

(52) U.S. Cl.
CPC ............ *A01K 45/007* (2013.01); *A61D 1/025* (2013.01); *A61M 5/20* (2013.01); *A61M 5/3286* (2013.01);
(Continued)

(58) Field of Classification Search
CPC .................................................. A01K 45/007
See application file for complete search history.

(56) References Cited

U.S. PATENT DOCUMENTS 4,469,047 A   9/1984  Miller
4,903,635 A   2/1990  Hebrank
(Continued)

FOREIGN PATENT DOCUMENTS

BR     PI0516122 A       8/2008
BR     102015027769 A2   5/2017
(Continued)

OTHER PUBLICATIONS

International Search Report from corresponding PCT Application No. PCT/BR2018/050342, dated Nov. 30, 2018.
(Continued)

*Primary Examiner* — Tien Q Dinh
*Assistant Examiner* — Katelyn T Truong
(74) *Attorney, Agent, or Firm* — Harness, Dickey & Pierce, P.L.C.

(57) ABSTRACT

Module for operational control of the guided advance/withdrawal device of the needle added to the smart substance injection device on board equipment for inoculating substances inside a fertile egg and smart method for injection inside a fertile egg, wherein the "inoculation of substances" inside a fertile egg, be this into the embryo, in the case of vaccines, and even into the amniotic fluid, in the case (Continued)

of a nutrient or nutritional vaccine complex, allows the injection needle (11) to be brought close at a controlled speed.

9 Claims, 28 Drawing Sheets

(51) Int. Cl.
  *A61M 5/20* (2006.01)
  *A61M 5/32* (2006.01)
(52) U.S. Cl.
  CPC ............... *A61M 2005/2013* (2013.01); *A61M 2005/206* (2013.01); *A61M 2202/30* (2013.01); *A61M 2205/18* (2013.01); *A61M 2205/3584* (2013.01)

(56) References Cited

U.S. PATENT DOCUMENTS

| | | | |
|---|---|---|---|
| 4,990,335 A | 2/1991 | Bateman et al. | |
| 5,136,979 A | 8/1992 | Paul et al. | |
| 6,244,214 B1* | 6/2001 | Hebrank | A01K 45/007 119/6.8 |
| 7,430,987 B2 | 10/2008 | Smith | |
| 7,503,279 B2 | 3/2009 | Correa et al. | |
| 2005/0284376 A1* | 12/2005 | Smith | A01K 45/007 119/6.8 |
| 2006/0102082 A1 | 5/2006 | Wolfe et al. | |
| 2006/0156989 A1* | 7/2006 | Hebrank | A01K 45/007 119/6.8 |
| 2007/0044721 A1 | 3/2007 | Ilich | |
| 2007/0137577 A1 | 6/2007 | Wolfe et al. | |
| 2010/0192859 A1* | 8/2010 | Smith | A01K 45/007 119/6.8 |
| 2015/0327521 A1 | 11/2015 | Leslie et al. | |
| 2018/0235188 A1* | 8/2018 | Da Silva Bastos | C12M 21/10 |

FOREIGN PATENT DOCUMENTS

| | | |
|---|---|---|
| EP | 2382688 A2 | 11/2011 |
| EP | 3145306 A1 | 3/2017 |
| WO | WO-2010/078434 A2 | 7/2010 |
| WO | WO-2015/179417 A1 | 11/2015 |

OTHER PUBLICATIONS

Gonzales, et al. (2003) "In OVO Supplementation Of 25 (OH)D3 to Broiler Embryos." *14TH Eur. Symp. Poult. Nutr.*, (Aug. 2003) (Lillehammer, Norway), pp. 72-74.

Office Action from corresponding Indian Patent Application No. 202017018378, dated Feb. 24, 2023.

Pedroso, et al. (2006) "Nutrient inoculation in eggs of heavy breeders." *Brazilian Journal of Animal Science, Brazilian Society of Zootechnics*, 35(5):2018-2026.

* cited by examiner

MODULE FOR OPERATIONAL CONTROL OF THE GUIDED ADVANCE/WITHDRAWAL DEVICE OF THE NEEDLE ADDED TO THE SMART SUBSTANCE INJECTION DEVICE ON BOARD EQUIPMENT FOR INOCULATING SUBSTANCES INSIDE A FERTILE EGG AND SMART METHOD FOR INJECTION INSIDE A FERTILE EGG

CROSS-REFERENCE TO RELATED APPLICATIONS

This application is a national phase application of PCT Application No. PCT/BR2018/050342, filed on 17 Sep. 2018, which claims priority to Brazilian Patent Application No. BR 13 2018 008855 5, filed on 2 May 2018 and Brazilian Patent Application No. BR 10 2017 023563 7, filed on Oct. 31, 2017. The entire disclosures of the applications identified in this paragraph are incorporated herein by references.

TERMINOLOGY

For the purpose of better understanding the matter disclosed and claimed in this patent application, the meaning of some terms in detail disclosed in the body of the specification is presented, where:

Poultry Farming: poultry breeding for food production, in particular meat and eggs.

Poultry species: among the species raised in poultry farming, chicken stands out and on a much smaller scale, poultry is also raised such as turkeys, ducks, geese, quails and ostriches.

Fertile egg: also known as fertilized egg, it is understood as an egg already fertilized by the rooster, which will generate an embryo that will develop until the final formation as a bird.

Embryo: for the purpose of this invention it is an immature organism, in the early stages of development, before leaving the interior of the fertile egg.

Amniotic liquid: or amniotic fluid, is the fluid that surrounds the embryo, filling the amniotic sac, which acts as protection from mechanical and thermal shocks and as a nutritional food, which the embryo feeds on during its development inside the egg itself.

Control factors: in order to guarantee the production with quality and productivity of poultry, notably broilers, specific vaccination (disease control) and nutritional procedures (obtaining poultry with weight, meat quality, etc.) are arranged for the bird embryo.

Intra-egg interference: also known as "in ovo", corresponds to all external interference inside an egg, commonly performed for vaccination or nutrition of fertile eggs of poultry species, especially in broilers.

In ovo nutrition: it is carried out in the pre-hatching phase of the egg where the embryonated egg shell is punctually punctured and then the nutrient is inoculated directly into the amniotic fluid through a syringe (Leitãao et al., 2005; Gonzales et al., 2003) and from the 15th day of incubation the embryo starts to ingest the amniotic fluid with incorporated nutritional supplement (Klasing, 1998).

Substances applied to fertile eggs: for the purpose of this invention, vaccines, nutrients and nutritional vaccine complexes are considered.

Intramuscular: related to the interior of a muscle;
Subcutaneous: located under the skin, hypodermic.

Fertile egg identification module: also known as candling, where the selection is made among fertile eggs, or fertilized, and non-fertile eggs, whose operational logic in a remissive way can be understood by visualization from the incidence of a beam light passing through the egg, the presence or absence of a shadow, which characterizes an embryo, where once identified as a fertile egg it is taken to an inoculation tray.

Inoculation tray: a tray provided with a plurality of housing niches intended to receive fertile eggs from the candling module.

Inoculation module for fertile intra-egg substances: responsible for inoculating vaccines and/or nutrients in all fertile eggs pre-classified in the candling module.

Fertile egg incubation module: after vaccination and/or nutrition of the fertile eggs contained in the incubator tray, they are transferred to a basket, called the hatcher basket, and the transfer is carried out using a suction cup device arranged in a matrix form, with a suction cup defined for each niche of the incubator tray, where once the basket is loaded, it is transported to the incubation area.

PLC: acronym for Programmable Logic Controller, is one of the most used controllers in the industry. Conceptually, PLC is an equipment designed to command and monitor machines or industrial processes. For the purpose of the present invention, PLC is the "brain" that controls all the operations provided for in the operational modules.

Stepper motor: a type of electric motor used when something has to be positioned very precisely.

Pneumatic valve: a valve that can operate with lower pressures or vacuum, with the external supply of the pilot (actuation).

Touch sensor: can be of the type of electrical contact, electric current, magnetic, inductive, among others.

Position sensor: can be of the type of electrical contact, electric current, magnetic, inductive, among others.

WIFI technology: wireless LAN devices;

Plug and play: means connect and use, where for the present demand can be understood as a quick connection conferring immediate communication and functionality between the main PLC and the injector device of the inoculation module of the vaccination equipment and or intra-egg nutrition.

Data communication protocol: set of rules that controls communication so that it is efficient and error-free. One of the protocol's main goals is to detect and prevent data loss during transmission if it occurs.

Modbus: data communication protocol used in industrial automation systems.

WIFI controller; is a SOC with integrated TCP/IP protocol that can give any micro controller access to its WIFI network.

Driver: Controller, transmitting and interpreting data between the operating system and a piece of hardware.

IoT (Internet of Things): in Portuguese it can be translated as "internet of things", whose best definition resides in a network of physical objects, vehicles, buildings and others that have embedded technology, sensors and network connection capable of collecting and transmit data. The objects of everyday life would be connected to the internet, acting intelligently and sensually.

The range of terms, technologies and technical concepts presented in this preliminary topic should be appreciated for the correct understanding of the present invention, giving the necessary descriptive sufficiency to the Specification, and should be used as reference for studies in comparative analyses whether with hypothetical state-of-the-art solutions which anticipate the invention and which are not mentioned in the present application as for products of the same nature and the same international patent classification (IPC), disclosed and/or marketed by the holders or third parties other than the holders of the present patent.

FIELD

The present application for a patent of invention as disclosed above and the subject matter of description and claim in this document relates to an inventive solution that finds outstanding benefit in the poultry farming sector, intended for the breeding of poultry, and more specifically in the area of breeding and development of embryos for the creation of poultry species.

In addition, industrial activity in the area of fertile egg production has embedded a degree of complexity that involves the macro steps:

1. Identification of fertile eggs,
2. Inoculation of substances into fertile eggs; and
3. Incubation of fertile eggs.

For the purposes of this patent, the invention finds specific utility in the stage of "inoculation of substances" in fertile eggs (vaccines, nutrients and even nutritional vaccine complexes).

Finally, the application, or inoculation, of substances in an intra-egg environment can occur in the following ways:

1. Intramuscular: specific for the inoculation of vaccines, in which case it is applied by means of needles that penetrate the epidermis of the embryo, also known as injectable medium.
2. Subcutaneous: specific for the inoculation of vaccines, in which case it is applied by means of needles that penetrate the epidermis of the embryo, also considered as an injectable medium.
3. Amniotic fluid: it is the mandatory route for the inoculation of nutrients, since it is the amniotic fluid that the embryo feeds on, orally. In this case, the substance is injected into the amniotic fluid and once the amniotic fluid+substance mixture is obtained, it starts to be consumed, orally by the embryo itself inside the egg.

For the purpose of this invention, the possibility of applying an intra-egg substance in all inoculation routes will be considered.

Accordingly, the field of application of the present invention is represented by the poultry sector, notably for the stage of "Inoculation of Fertile Intra-Egg Substance", either in the embryo, in the case of vaccines and also with the amniotic fluid, in the case of nutrients or nutritional vaccine complex.

BACKGROUND

Description of the Invention

Effectiveness of intra-egg inoculation: In view of the field of application, the applicant identified the major need to provide nutritional supplement or nutritional vaccine in fertile eggs in the pre-hatch phase, notably in the amniotic fluid, without any type of physical impairment occurring for the embryo and, therefore, what is not uncommon to lead to its death. In other words, it should not be forgotten that the embryo inside an egg is an extremely fragile being, and therefore any contact coming from outside the egg must be carried out with the utmost care.

B. Of the ergonomics of installation and operation: it is also the identified need to provide better functional and ergonomic conditions of installation of the operational modules of the system of gestation of birds, more specifically to the module of inoculation of substances intra ovo and operational ergonomics, notably with respect to the installation and operation of the plurality of connecting devices of respective needle advancing/withdrawing devices (aggregated to respective substance injection devices), which operation is primarily driven by the general operational control module, dictated by a Programmable Logic Controller (PLC).

Objectives of the Invention

In line with the demand for the invention, the applicant devised a "OPERATIONAL CONTROL MODULE FOR THE NEEDLE ADVANCE/WITHDRAWAL DEVICE COMBINED WITH A SMART SUBSTANCE INJECTOR DEVICE FOR SUBSTANCE INOCULATION INTO FERTILIZED EGGS AND INTELLIGENT SUBSTANCE INOCULATION INTO FERTILIZED EGGS" with novelty associated with associated with inventive activity, since it does not follow in an obvious or evident manner from other techniques anticipated by the state of the art, conferring advantages from the industrial, commercial and technical points of view.

In addition the "invention" is provided with industrial applicability, being economically feasible and thus considering the accuracy of the patentability requirements, mainly as an invention patent, as set forth in the dictates of Articles 8, 13 and 15 of the Industrial Property Law 9.279/96.

Fundamentals of The Technology

In order to provide veracity, and to consolidate the context explained in the topics of the introductory table, an explanation of the state of the art for conventional fertile intra-egg vaccination modules will be presented, where after critical analysis of these, once evaluated by technicians with expertise in the subject of procedures and operation of inoculation of intra-egg substances, its limiting aspects will be pointed out and commented on, thus consolidating the identification of the previously mentioned demand.

a. Poultry Gestation System.

Formed by three major operational modules:

A Module for identification of fertile eggs (candling).
An Inoculation module for intra-egg substances.
A Fertile egg incubation module.

For the purpose of the present invention, the intra-egg substance inoculation module is defined as the study paradigm, where a conventional embodiment thereof is described in detail.

b. Injection of Fertile Intra-Egg Substance Module.

It is comprising a set of different devices, of which they are considered most relevant:

b.1 Inoculation platform device, formed by an aerial platform in which a plurality of substance injector devices are defined, where this platform describes movement of positioning and approaching the inoculation tray where the fertile eggs are.

b.2 Substance injector devices, consisting essentially of a peel perforator and an injection needle, which can be activated either in the amniotic fluid (in the case of nutrient or nutritional vaccine compound) or via intramuscular or subcutaneous penetration (in the case of vaccine).

b.3 Contact stabilizing devices for the injector devices of substances with the egg surface, for the inoculation procedure.

b.4 Sanitizing device of the flow circuit of the substance to be inoculated, considering the injection needles. For the purpose of the present invention, only the substance injector device will be considered.

All of the aforementioned devices are managed by an intelligent operations module, which in turn refers to a PLC controller.

W. For the purpose of the present invention, the object of the present invention will be the operational condition of the substance injector devices, where research in a patent database reveals that there are numerous solutions idealized for the application of substances within the fertile egg, among the following patent documents deserve mention:

U.S. Pat. No. 4,990,335 A entitled "High speed automated injection system for avian embryos, published Feb. 27, 1990, which relates to an automated high-speed injection system for avian embryos.

U.S. Pat. No. 5,136,979, entitled "Modular injection system for avian embryos", issued Aug. 11, 1992, which relates to a Modular Injection System for avian embryos.

U.S. Pat. No. 7,503,279, entitled "Automated egg injection machine and method for injection into an egg", published Mar. 26, 2006, which deals with an automatic device and method of injection into eggs.

The examination of these patent documents allows a first understanding that originally this module of inoculation of substances was designed essentially with the design paradigm of inoculation of substances such as vaccines.

In addition, one skilled in the art would conclude that in essence they all have the same basic constructive and operational concept, which in can be understood as a plurality of injector devices each provided with piercing elements and needles, where each unit of these is intended to act in the respective niches of fertile egg housing defined in the incubation tray.

In turn, this basic constructive concept makes the operational logic feasible where once the incubation tray is positioned under the fertile intra-egg substance inoculation module, its matrix set of injectors is activated, moving down collectively towards the corresponding niches of the incubator tray, until the contact of the perforator occurs with the surface of the eggshell, where this contact sends a signal to the PLC of the automated system, which in turn returns a signal to actuate the actuator that operates the perforator. Once the eggshell barrier is overcome, the path is opened for the needle to penetrate into the egg.

The downward stroke of the needle is specified for a standard displacement value and constant speed, where this condition is achieved by pneumatically triggering the inoculation needle displacement.

In particular, the displacement course also has as a paradigm a "hypothetical and standard" position inside the egg, which guarantees the needle-piercing of the embryo's body.

This operational condition is called a blind approach, since the operational module does not see the position of the embryo inside the fertile egg.

Once the end of the stroke has been reached and the needle penetrates the embryo, the PLC recognizes this condition and activates the substance injection trigger mechanism, in the case of vaccine, featuring an intramuscular or subcutaneous inoculation injection.

After the injection is completed, the PLC sends a a feedback signal for retro-activation of the substance injection triggering mechanism, such that the injection needle is retracted and the fertile intra-egg substance inoculation module returns to its resting position, until a new inoculation cycle begins for the subsequent inoculation tray.

d. Identification of the problem: as already mentioned in the operational description of the conventional module for inoculation of fertile intra-egg substance, this concept of "blind advancement" although it is appropriate for the inoculation of substances as a vaccine, as it guarantees intramuscular or at least subcutaneous penetration (as long as it does not reach the embryo's organs) this same condition is not suitable when the objective is to inoculate nutrients, since for this substance the inoculation must be restricted to amniotic fluid, under the risk of compromising not only physical integrity of the embryo, but it can also lead to the compromise of its development until hatching as a bird, and more critically, it can be responsible for the high rate of embryo mortality as soon as the stage of substance inoculation is finished.

For a skilled artisan, such a limiting condition for "blind advancement" is comprehensive, since it was designed for the inoculation of vaccines, notably injections through intramuscular or subcutaneous means.

Since there is no biological motivation for the "blind advancement" to be effective, it is evident that in the state of the art the substance inoculation modules, as disclosed in patent documents U.S. Pat. Nos. 4,903,635 A, 5,136,979 and 7,503,279 already described a needle displacement mechanism with satisfactorily design, that is, a simple pneumatic actuation mechanism is sufficient for displacement movement until the end of stroke and at a constant speed.

In a remissive but exhaustive manner, the constructive and operational concepts of conventional modules for inoculation of intra-egg substances, have the following technical characteristics:

Activation of the injection needle stroke is carried out by means of an electropneumatic valve;

Only two positions of the injection needle are provided, namely: retracted position, or start of stroke and advanced position or end of stroke;

As it is a system of "blind advancement" of the injection needle, it does not have control of its position, being a source of mortality and deficient development of embryos, since the system acts with a total standard advance course, which does not match the embryo height differences in relation to the surface of the amniotic fluid, which is variable for each unit of fertilized egg.

The forward and reverse control of the injection needle by means of an electropneumatic valve is determined by the time previously specified in the PLC control centre, The rate of forward and/or retraction of the injection needle is also performed by the pneumatic valves, but with the precision of this control is limited, which for the inoculation of vaccine intramuscularly or even subcutaneously in the embryo, is not a nutrient inoculation becomes a source of mortality and deficient embryo development.—the injection needle advance and retraction control by means of an electropneumatic valve is determined by the time, previously specified in the PLC control centre, The injection needle advance and/or retraction activation speed is also carried out by pneumatic valves, but with limited control accuracy, which is not a problem for inoculating the intramuscularly or even subcutaneously vaccine in the embryo, but for the inoculation of nutrients it becomes a source of mortality and deficient embryo development.

In addition to the forward movement of the injection needle without speed control there is also no control of the force that the needle will employ in the body of the embryo. This force, even if reduced, depending on the diameter and tip of the needle, has the ability to pierce the embryo, reaching its vital organs and even causing the embryo to die.

As it turns out, certainly known solutions of the state of the art for the substance inoculation module inside fertilized eggs, it is not effective when the equipment must be operationally configured for nutrient inoculation.

SUMMARY

The Objectives:

a.1 From the Point of View of Embryo Safety

It is a first object of the present invention to ensure that the inoculation of substances, especially nutrients and nutrient vaccines, is carried out only and only directly in the amniotic fluid present within the fertile egg and at any time designated between the surface of the amniotic fluid and adjacent to the surface of the embryo's body resting inside the egg.

It is a second object of the present invention, still having as a procedural object the application of substances as nutrient or nutrient vaccine, ensure that the advancement of the injection needle does not puncture or injure the embryo since the force employed must be less than the resistance that the embryo offers to the touch to the point of not being punctured.

a.2 From a Technical Point of View

It is an object of the invention to provide an intelligent injection module with:

Constructive simplicity;

Agility to provide communication "intelligent injector device" communication with the PLC;

Reduced volume, both at the tip of the "smart injector device" and at the tip of the PLC;

Reduced size of the control panel, both general and the local panel added to the substance inoculation module;

Ease of assembly together with equipment for inoculation of substances used in the field (used).

a.3 From the Economic Point of View:

Its first objective is to provide an economically attractive solution, with a reduction of the industrial cost for the module of inoculation of substances.

Its second objective is to provide an economically attractive solution, with a reduction in the total effective industrial cost of the substance inoculation equipment.

B. From the operational logic: a novel technique of substance inoculation has been devised, antagonistic to the so-called "blind advance" technique of the injection needle applied in the solutions known in the prior art (see U.S. Pat. No. 4,990,335 A, quoted in the topic fundamentals of the technique) to what will be termed as "guided advancement" of the injection needle. For the intelligent injection module to meet the previously defined objectives, the following list of properties of a kinematic nature was taken as the paradigm for the injection needle component of the substance inoculation module:

Advance of the injection needle with controlled speed, without definite end of stroke;

Interference perception of the injection needle end next to the embryo body, defined the end of the injection needle displacement stroke and recognition by the PLC of the position of the embryo;

Perception of absence of embryo or absence of egg in the niche of the incubation tray, ensuring that in this condition there is no unnecessary inoculation of the substance;

Perception of non-perforation of the eggshell, and immediate disabling of the inoculation module;

Immediate pre-withdrawal of the injection needle, with the location information of the embryo, it is possible to position the injection needle at a distance, discrete or not, for exclusive administration of the nutrient in the amniotic fluid;

Immediate release of the inoculation substance into the amniotic fluid as soon as it recognizes the embryo;

Return of the injection needle to its starting position, as soon as it performs the inoculation of the substance, either in the musculature of the embryo or in the amniotic fluid;

W. Distinctive Features:

The constructive concept: in order to make the operational logic feasible summarily it can be understood as a device coupled to the substance inoculation module, which is referred to in this carton as an intelligent injection device, the constructive and operational concepts of which have the following technical characteristics:

Injection needle displacement mechanism is actuated by means of a stepper motor, which confers a differentiated precision on the movements generated;

It has at least one touch sensor of the injection needle in the embryo that feeds this condition to the PLC;

It has at least one position reference sensor (home position), which feeds this condition to the PLC;

The PLC can accurately control the feed rate of the injection needle, as a result of the frequency of the electrical pulses sent to the step motor; and Possibility of the PLC to identify the position of the injection needle, which is calibrated according to the number of electrical pulses sent to the motor.

c.2 Operational communication systems: the use of an operative control module of the needle guided feed/withdrawal device added to the intelligent substance injector device, either by wiring or without cabling, also known as "Wireless"or "WIFI", and because it is considered as preferential will be described here in greater detail.

c.2.1 WIFI applied to the inoculation module: with the advancement of technology, in particular IoT (Internet of Things), internet of things, it is possible to connect almost any object, however small, through a wireless network which may be connected to the internet. Through this connection it is possible to perform data acquisition and act according to the available hardware in the object.

In the present case the technology applied to the substance inoculation module as a whole managed by a PLC has been devised a new technique in the form of an injection kit based on the improvement of the intelligent injection device with wireless communication such as protocol of "WIFI" communication, making it practically "plug and play" the implementation in in ovo vaccination equipment in the market.

Therefore, the design of the "wireless" intelligent injector device includes the availability of dedicated components with IoT technology, which, in addition to being smaller, also have high reliability and low cost due to high-scale production.

c.2.2 Design Requirements:

A "WIFI controller driver" has been installed on all components of the constructive concept belonging to the "intelligent injection device";

The hardware consists of a controller device with processing capacity, 12 configurable points as inputs or outputs and WIFI communication along with a driver for controlling the step motor of the substance injector arrangement;

A compact and mobile panel for the operational management of the intra-egg inoculation module is defined, to which a corresponding "WIFI controller driver" is provided; and A general operational management panel for intra-egg inoculation equipment is defined, to which a corresponding "WIFI controller driver" is provided.

BRIEF DESCRIPTION OF THE DRAWINGS

A set of drawings and block diagram presented as an appended part to this descriptive report has the object of supporting full understanding of the subsequent topic of the detailed description of the invention, where in a remiss way, contemplates both the field of application and the state of the art considered useful to the understanding of the invention and finally a preferred embodiment of the invention itself, including the detailing of its inventive constructive concept and corresponding operational logic embedded therein, wherein.

DETAILED DESCRIPTION

The following detailed description should be read and interpreted with reference to the drawings and block diagram presented, representing the state of the art for poultry breeding system, evidencing the intra egg inoculation module, illustrating its negative aspect, and then presenting a preferred embodiment of the invention in the form of an intelligent substance injection device, and further demonstrating its operational logic, is not intended to limit the scope of the invention, this limited only to that set forth in the claims.

The of the system of development and reproduction of birds.

Figure 1:
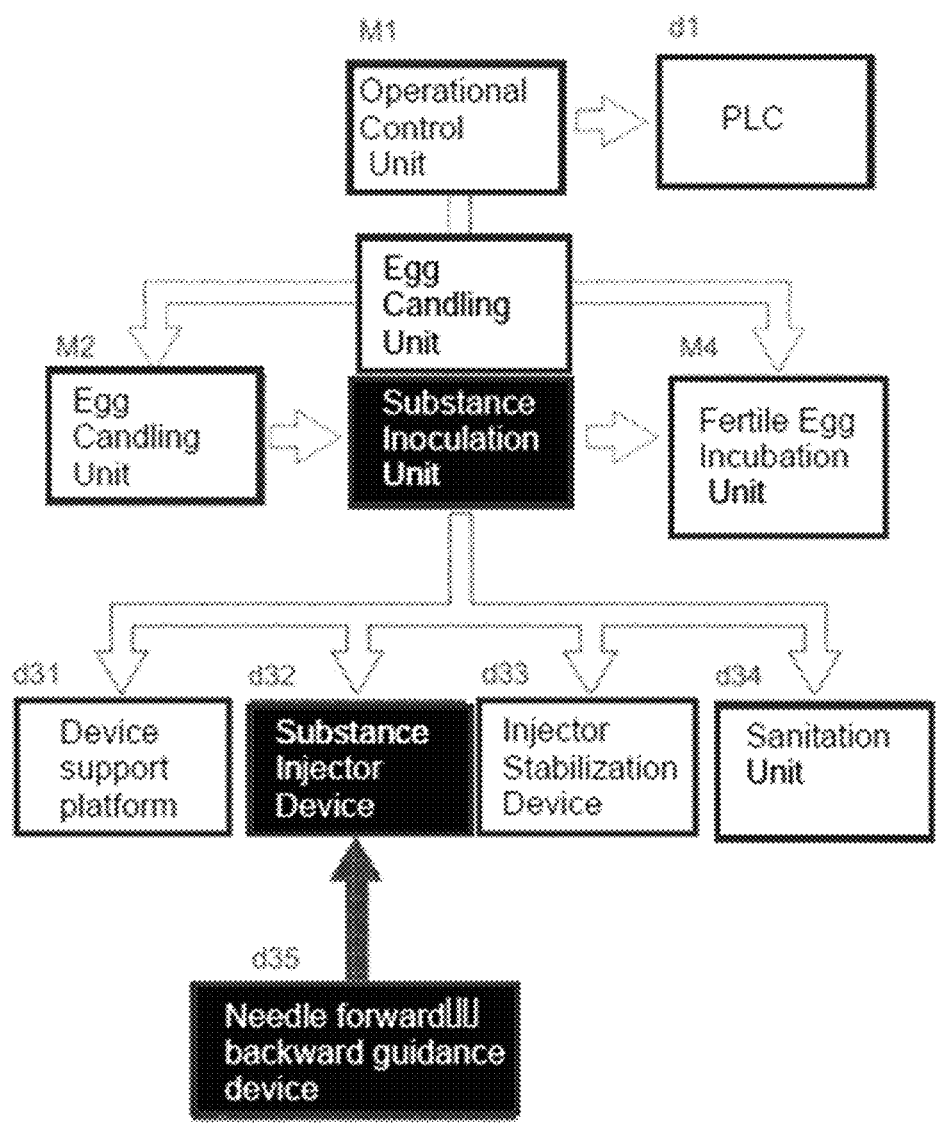
FIG. 1 is a block diagram representation, representative of the general architecture of a poultry breeding system, showing the operational module of interest, ie the intra-egg substance inoculation module, in which it is applied the inventive device.
Figure 2:
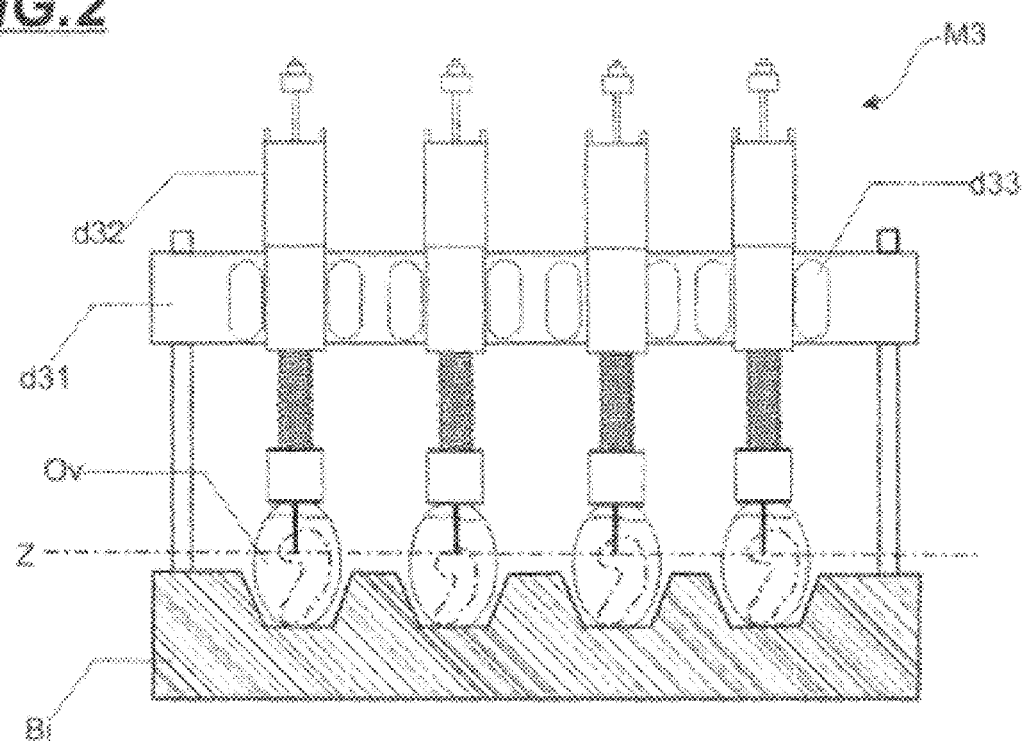
FIG. 2 is an illustrative side view of the constructive concept of the fertilisation module of substances in fertile eggs anticipated by the state of the art, its operating devices being represented in an intra-egg substance release condition, showing the injection device of conventional substances.

Applicants understand that it is imperative to provide the reader with an overview of the bird breeding system, more specifically for the development of fertile eggs, up to the pre-stage-shield, where, through FIG. 1, the three major operational modules are defined as follows:

Operational control module (M1), operated essentially by a PLC device (d1);
Eggplant module (M2);
Intra-egg substance inoculation module (M3);
Incubation module of treated fertile eggs (M4);

Going beyond as well defined in the topic of Field of Application, the invention finds particular utility and application together with the intra-egg substance inoculation module (M3), which as well defined in the block diagram of FIG. 1 and in the illustrative representation of the FIG. 2, is formed by a plurality of operating devices, of which the four (4) of major importance, as defined are listed:

Support platform device (d31);
Substance injector device (d32);
Injector stabilizer device (d33);
Sanitizing applicator device (d34).

Again, as well defined in the Field of Application topic, the invention has been devised to make intelligent the operation of the substance injector device (d32), wherein to such a device is added a new device, referred to in that carton as "(d35)" whose practical effect of its introduction allows an inoculation operation with guided advancement of the injection needle in detriment of the blind advance inoculation operation which characterizes the conventional substance inoculation module.

Figure 5:
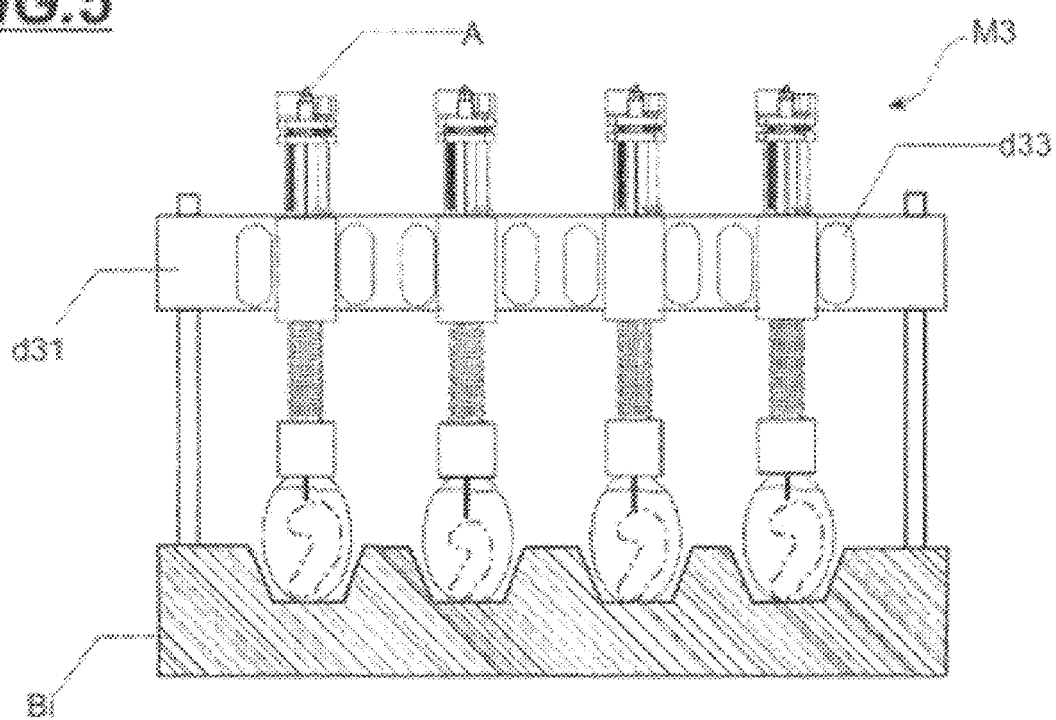
FIG. 5 is an illustrative side view of the constructive concept of the fertilisation module of substances in fertile eggs anticipated by the state of the art, its operating devices being represented in an intra-egg substance release condition, showing the injection device of substances.

For better understanding, in the development of the present detailed description, the connection between injector needle guiding device (d35)+substance injector device (d32) will be referred to as an "intelligent injector device", referenced in drawings by reference number (A), from FIG. 5.

Operational management of all devices is performed via the PLC device (d).

b. State of the Art

Figure 3:
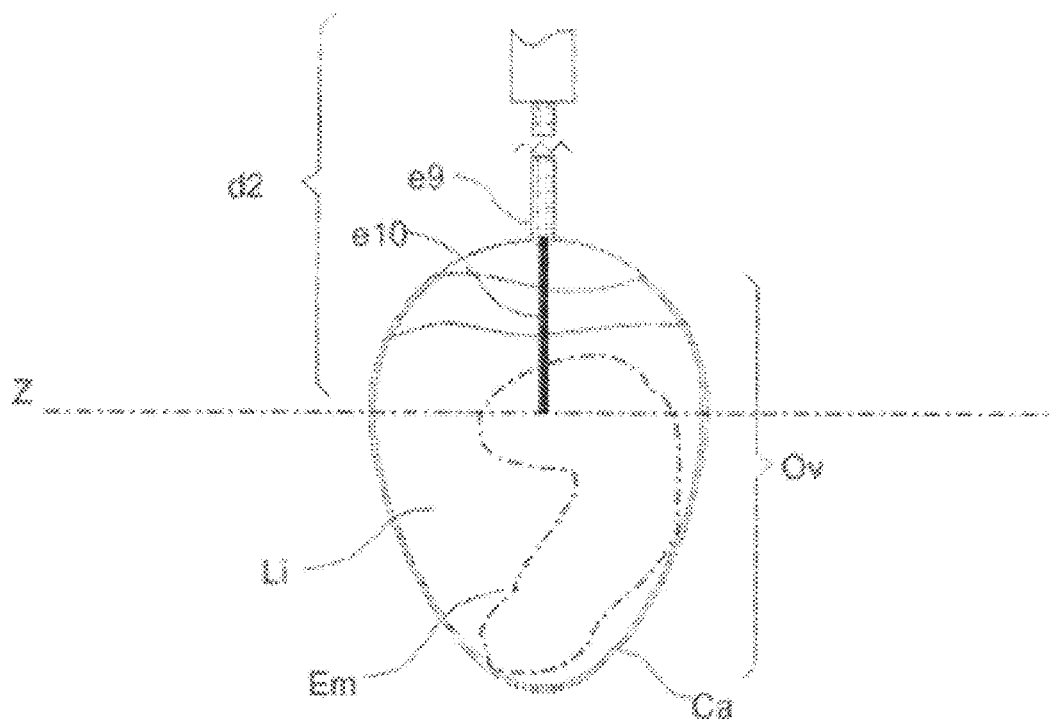
FIG. 3 is an enlarged detail view of a fertile egg during procedure of inoculation of intra-egg substance, evidencing the occurrence of undue penetration of the needle into the body of the embryo, which leads to compromised embryo development, especially in the case of inoculation of nutrients.

In the development of the topic of Fundamentals of the Technique, the module of intra-egg inoculation (M3) was exhaustively analyzed, showing its main negative point, which is shown in FIG. 3, where it indicates that the needle e10 after passing through the bark (Ca) of an egg (Ov), advances unduly within the body of the embryo (Em), even reaching its vital organs, which in synthesis is not a desired condition, either for vaccine inoculation or of nutrients, because it attacks this embryo to the point of rendering ineffective the vaccine and nutritional treatment, being able to besides compromising the obtaining of a cutting bird with the requirements of weight gain in a short time during its life cycle after hatching, is also responsible for high mortality rate, still in the incubation phase.

Figure 4:
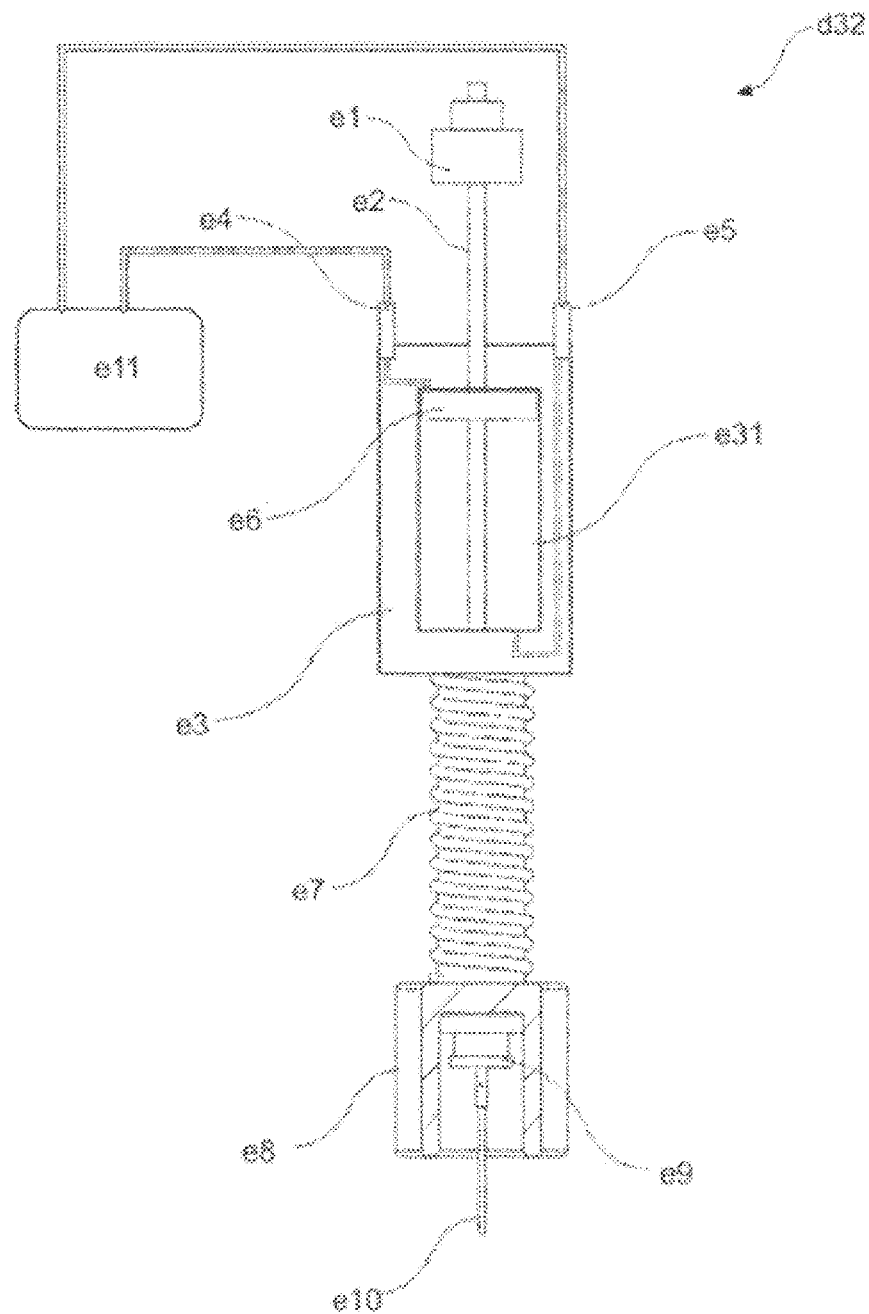
FIG. 4 is an illustrative cross-sectional view of a conventional substance injector device, showing its component parts.

In order to provide more transparency to the cause of the problem, the conventional relief device (d32) is illustrated in FIG. 4, showing the following components:

Support (e1), or platform, of the needle e10;
Needle shaft (e2) e10;
Injector body (e3);
Chamber (e31) of the injector body (e3);
Air inlet (e4) in the injector body (e3), with the function of allowing the piston (e6) to move and consequent movement of the rod (e2) and needle e10;
Piston (e6), to which the rod (e2) is connected with a needle e10;
Leveling spring (e1), with function of stabilizing the coupling cup (e8) when in counting with the egg (Ov);
Coupling cup (e8), with the function of providing coupling and stability to bark (Ca) perforation operations and needle penetration e10;
Perforator (e9), with function of providing perforation of eggshell (Ca) of egg (Ov);
Injection needle e10, connected to the stem (e2); and
Pneumatic valve (e11), with the function of promoting the circulation of air inside the chamber (e31) which makes it possible to move the plunger (e6), which consequently promotes the displacement of the needle e10.

Once again, the operational concept from the actuation of a pneumatic valve (e11), is responsible for the so-called "blind advance" of the needle e10 inside the egg (Ov).

W. From the Inventive Concept c1 Intelligent Injector Device (A)

c.1.1 Constructive concept: In order to counterbalance the "blind advance" of the needle e10, the unprecedented "injection needle/needle guided device (d35)" has been devised which is added to the operating elements of the injection device wherein said union will be referred to as the "smart injector device (A)", which is applied to the intra-egg substance inoculation module (M3) instead of the conventional injection device (d32), as shown in FIG. 5.

Figure 6:
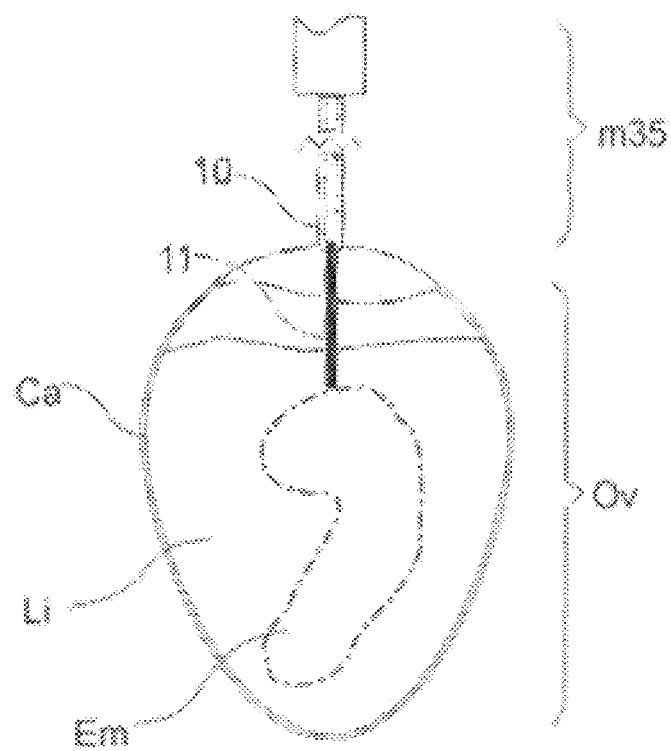
FIG. 6 is an enlarged detail view of a fertile egg during intraocular substance inoculation procedure, evidencing the occurrence of needle contact in the embryo body, where the needle advance immediately ceases.
Figure 6A:
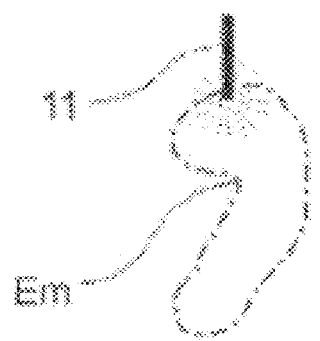
FIG. 6a is an enlarged detail view of the embryo+ amniotic fluid +end of the needle interaction region, where after established needle+embryo contact (see FIG. 6), the PLC sends sufficient forward controlled needle message for intramuscular or subcutaneous penetration, and subsequent injection of substance, a condition that is defined when inoculating vaccines.

In order to emphasize the desired technical effect, of inoculation of substance, be it vaccine, nutrient or even nutritional vaccine complex, with maximum efficacy and that minimizes embryo deaths, it is said, a desire long recognized by experts in the subject, is presented in FIG. 6 shows a condition where the contact of the needle (11) with the body of the embryo (Em) occurs, where from of this moment the operational control module (M1) decides by two sequences:

In the case of vaccine inoculation, the PLC (d1) acyl device is an operative kinematics routine of the intelligent injector device (A), where it in turn promotes a discrete advance of the needle tip (11) over the epidermis of the embryo (Em), promoting precise and sufficient penetration only to enter intramuscularly or subcutaneously, for subsequent injection of the substance (Su), specifically a vaccine, as illustrated in FIG. 6a.

Figure 6B:
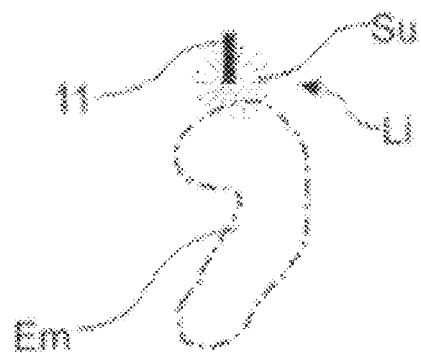
FIG. 6b is an enlarged detail view of the embryo+ amniotic fluid+needle end region, where after established needle+embryo contact (see FIG. 6), the PLC sends a controlled withdrawal message from the needle sufficient for the end of the needle is free in the amniotic fluid, a condition that is defined when inoculating nutrients or nutritional vaccine complex.
Figure 7:
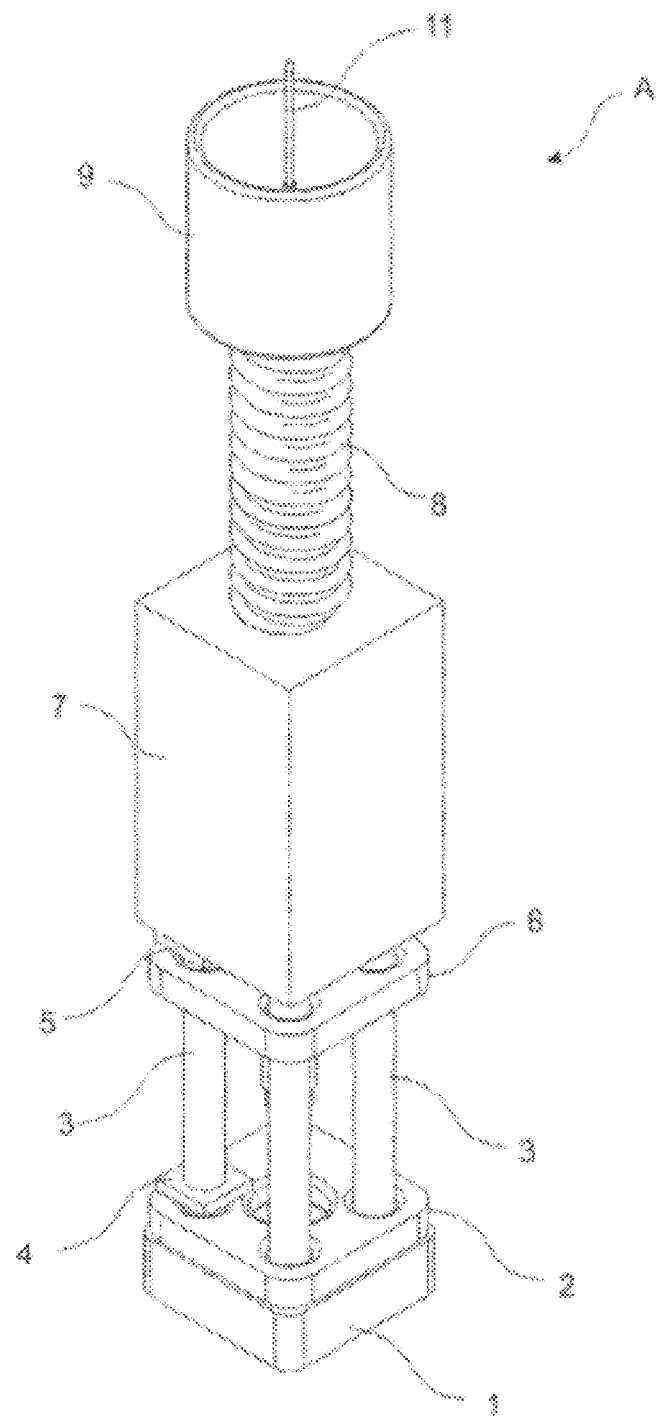
FIG. 7 is an illustrative representation, in perspective view of the intelligent injector device of substances, showing their component parts.
Figure 8:
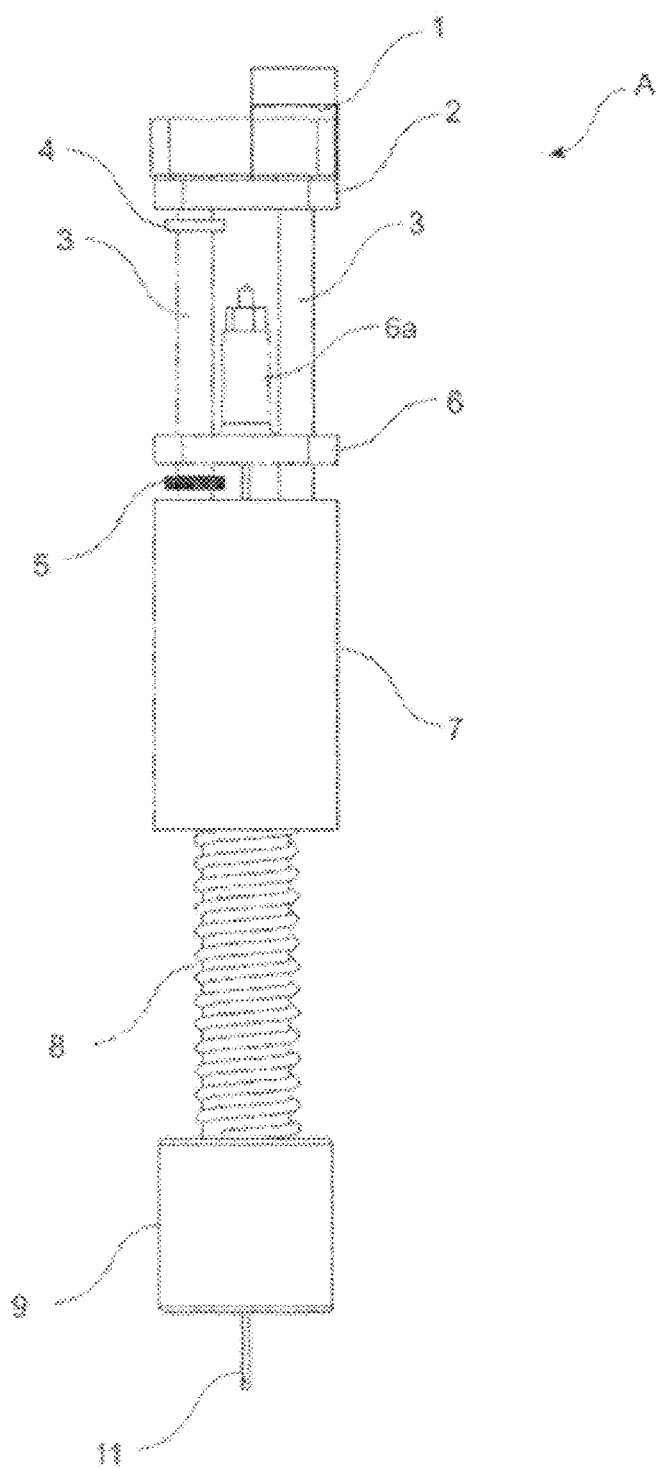
FIG. 8 is an illustrative side view of the intelligent injector device showing its component parts.
Figure 9:
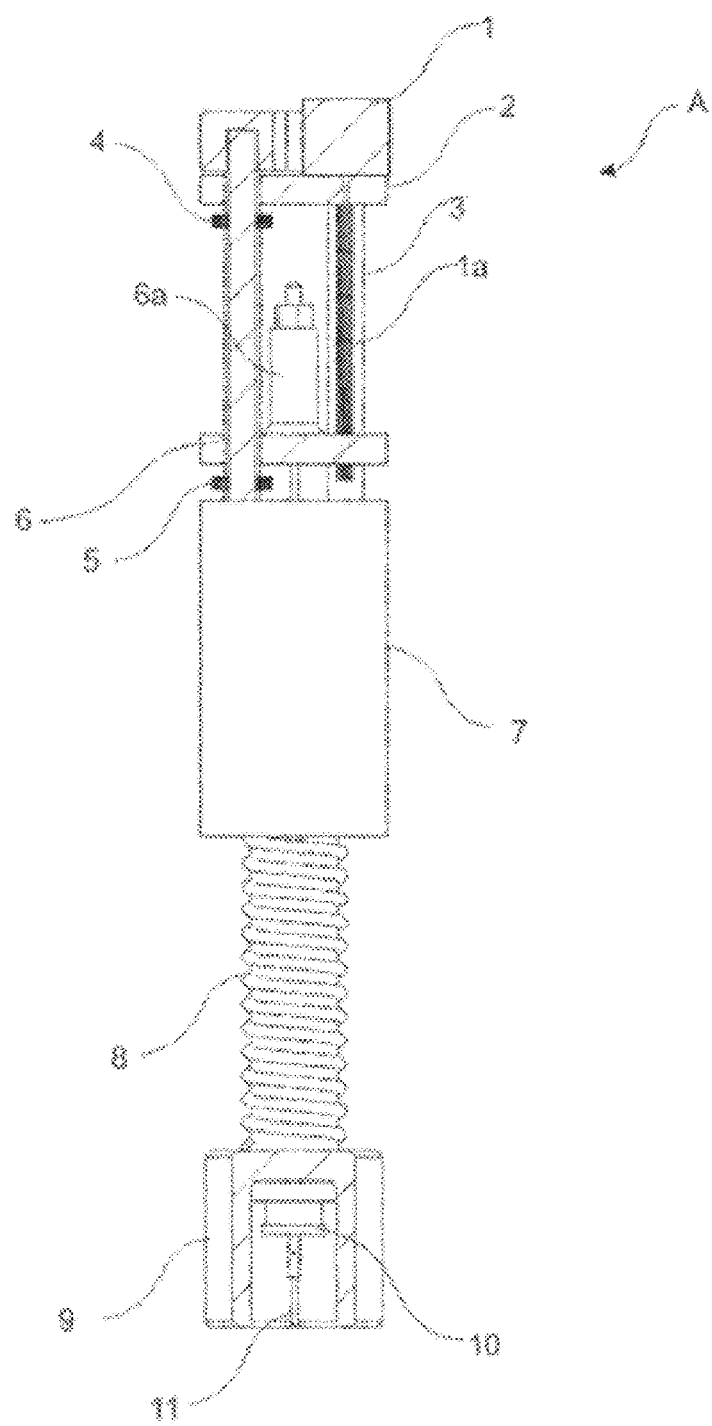
FIG. 9 is an illustrative cross-sectional view of the intelligent injector device showing its component parts.
Figure 18:
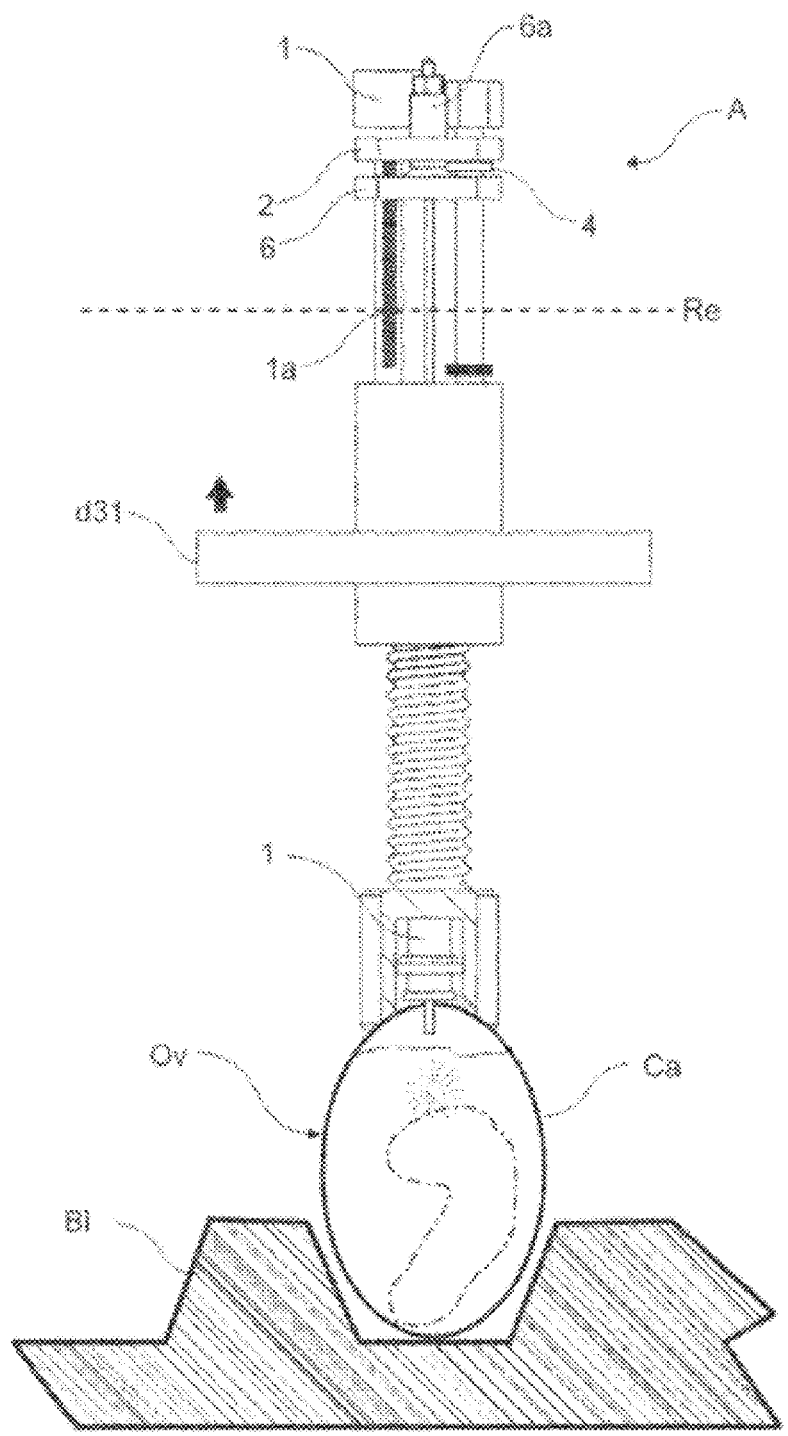
FIG. 18 is an illustrative side view of a unit of the smart substance injector device in the step of fully withdrawing the punch into the injection device.
Figure 19:
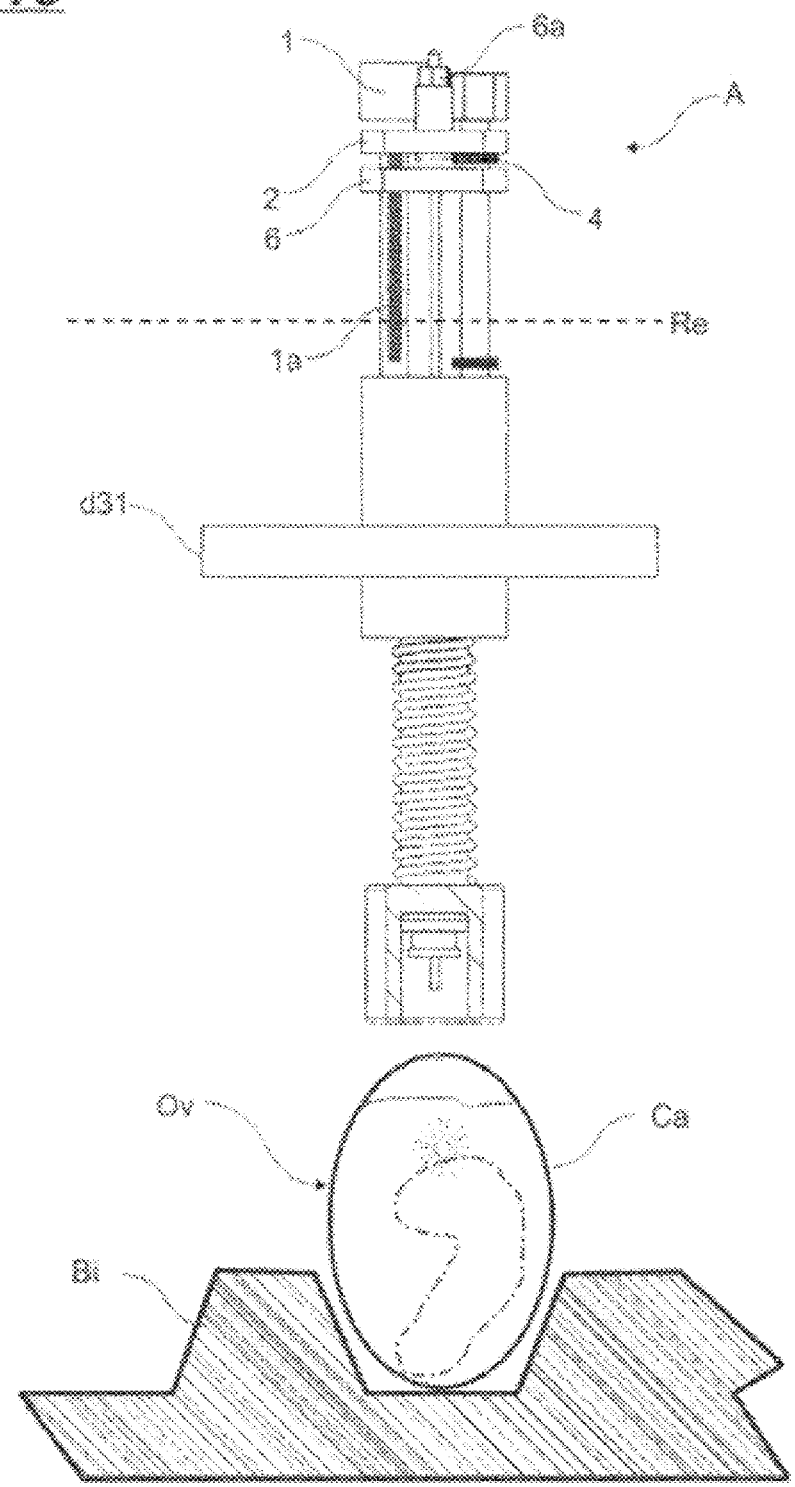
FIG. 19 is an illustrative side view of an intelligent injector device unit in initial status for re-inoculating a substance.

If nutrient inoculation, or even nutritional vaccine complex, the PLC device (d1) triggers the operational kinematics routine of the smart injector device (A), where in a remittent manner, it promotes a discreet withdrawal of the needle end (11) from the epidermis of the embryo (Em), isolating the end of the needle (11) into the amniotic fluid (Li), for subsequent injection of the substance (Su), specifically a nutritional or nutritional vaccine complex, as shown in FIG. 6b.

c.1.2 Of the distinguishing feature: In order to render feasible the intra-egg (Su) inoculation conditions, under the conditions illustrated in FIGS. 6a and 6b, due to an intelligent stopping point, shown in figure. "smart injector device (A)", the constructive concept of which in a preferred embodiment is illustrated in FIGS. 7, 8 and 9, wherein the following components are defined:

Step motor (1), with function of providing rotation to the spindle (1a);

A spindle axis, mounted perpendicular to the rotor axis of the stepper motor (1), to provide a linear displacement of both the platform (2) of the stepper motor (1) and the support platform of the needle (6);

A platform (2) for supporting the stepper motor (1), being mounted through its holes (not referenced), the guide columns (3) and the spindle axis (1);

Guide columns 3, a set of three columns whose bases are fixed on the injector body 7, and from which the platform 2 and the needle support platform 6 are mounted.

a touch sensor (4) mounted and fixed to the top of a guide column (3), and immediately below the platform (2), where in the start position of the inoculation cycle, its upper surface receives interference from the lower surface of the platform (2) of the step motor (1), said sensor having a function to send signal to the PLC (d1) when the controlled touch of the needle (11) occurs with the epidermis of the embryo (Em);

Position sensor (5), mounted to the lower part of a guide column (3), in a reference position ensuring that if the needle support platform (6) touches it, a signal is sent indicating PLC (d1) that there is no embryo (Em) inside the egg (Ov), or even that there is no egg in the niche of the incubation tray (Bi), see FIG. 19, aborting the release of inoculation and immediate return of the device (A) the start position of the new inoculation cycle, see FIG. 18.

a support platform for the needle (6), with a function of providing support for the needle (11), being fitted through its holes (not referenced), the guide columns (3) and further threadedly through a threaded hole (not referenced) next to the spindle axis (1a);

Needle coupler (6a);

Injector body (7), with supporting function in the upper part, the guide columns (3), and in the lower part the leveling spring (8);

Levelling spring (8), with the function of stabilizing the coupling cup (9) when in counting with the egg (Ov);

A coupling cup (9) for providing coupling and stability to the shell piercing (Ca) and penetration of the needle (11);

A punch (10), with the function of providing perforation of the shell (Ca) of the egg (Ov); and An injection needle (11) connected to the needle support platform (6).

Figure 10:
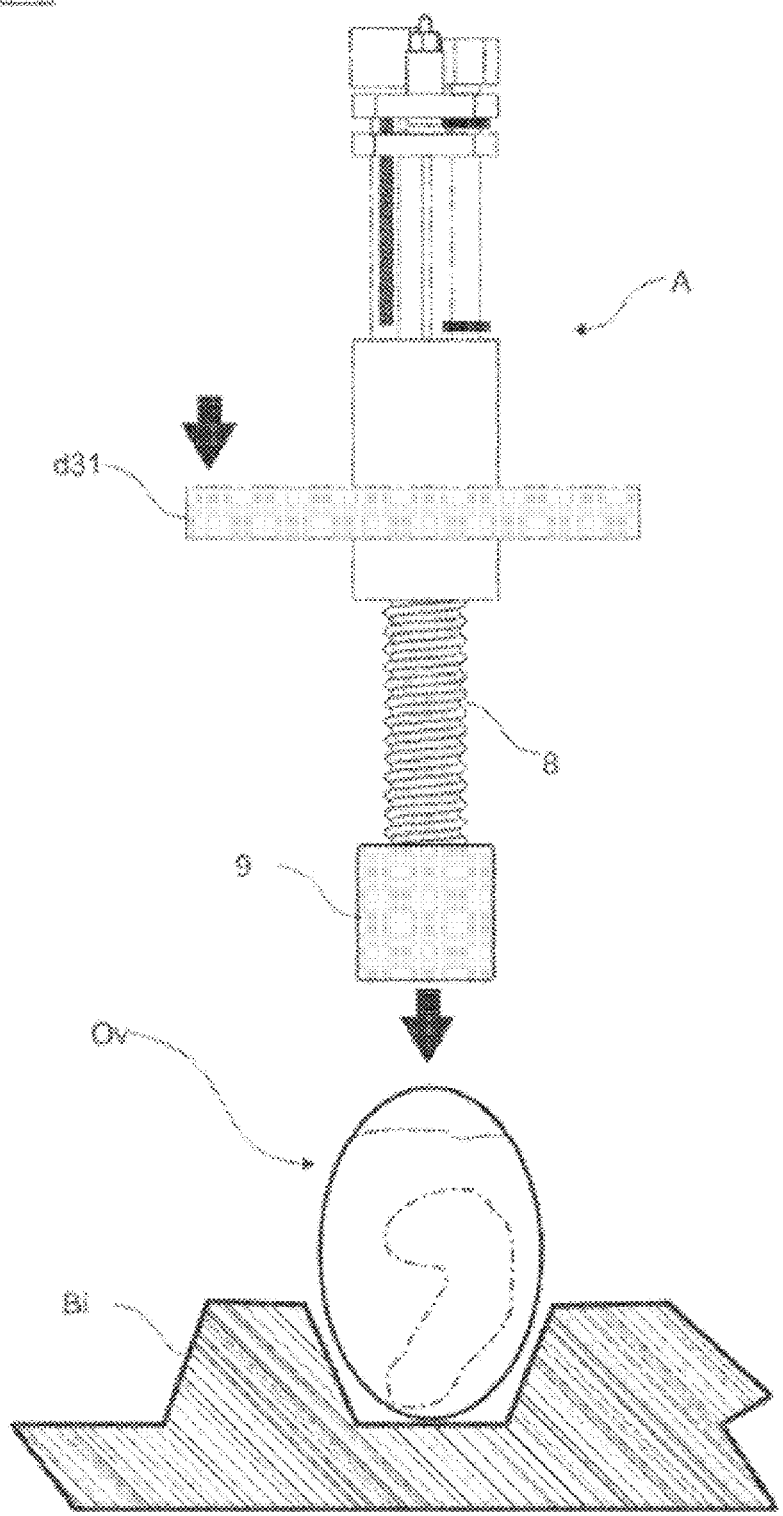
FIG. 10 is an illustrative side view of a unit of the smart injector device in the positioning step on the respective fertile egg niche of the inoculation tray which will receive the vaccine, nutritional or nutritional vaccine complex treatment.
Figure 11:
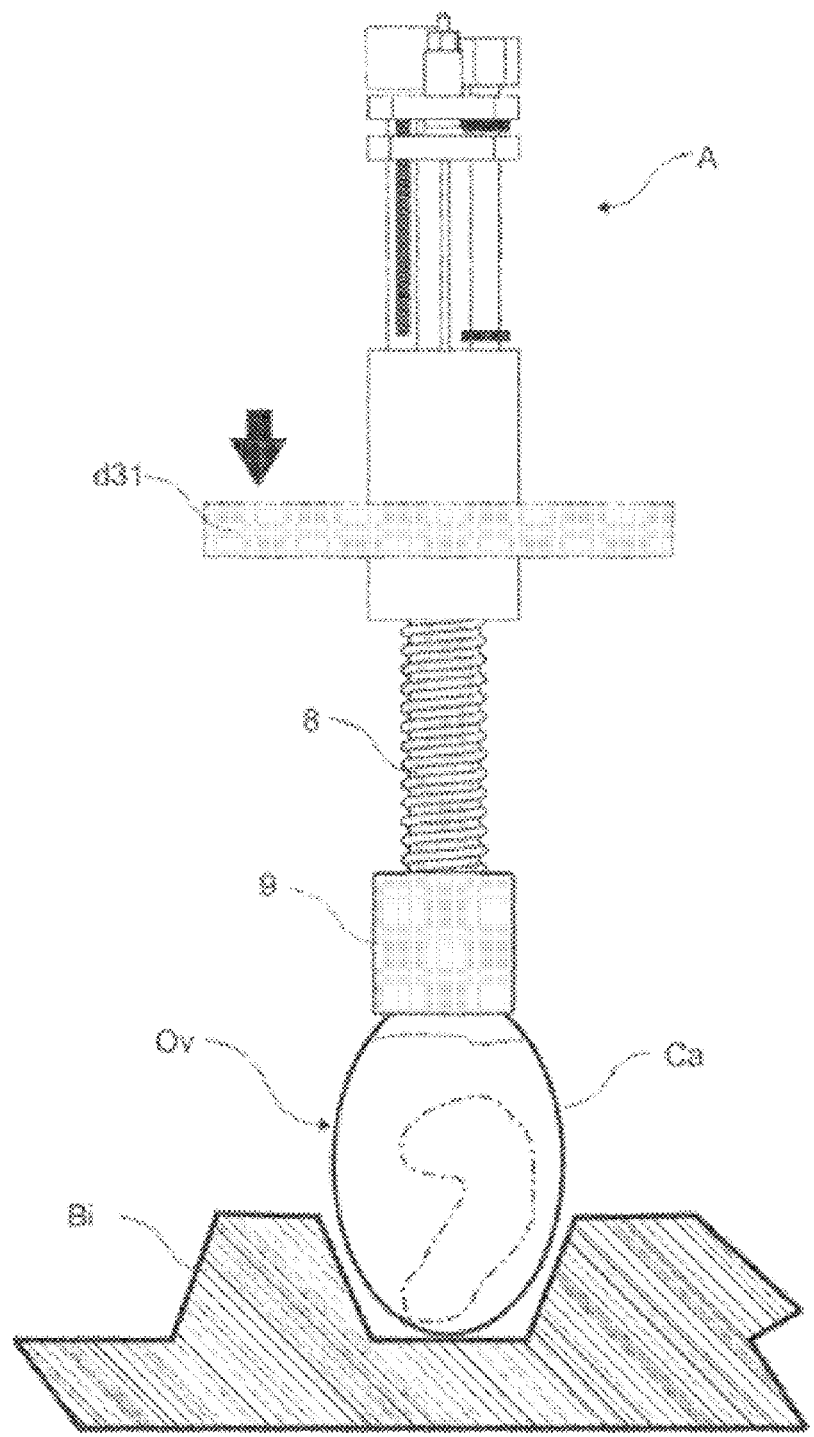
FIG. 11 is an illustrative side view of a unit of the smart injector device in the step of accommodating the coupling member on the surface of the fertile egg to be treated.
Figure 12:
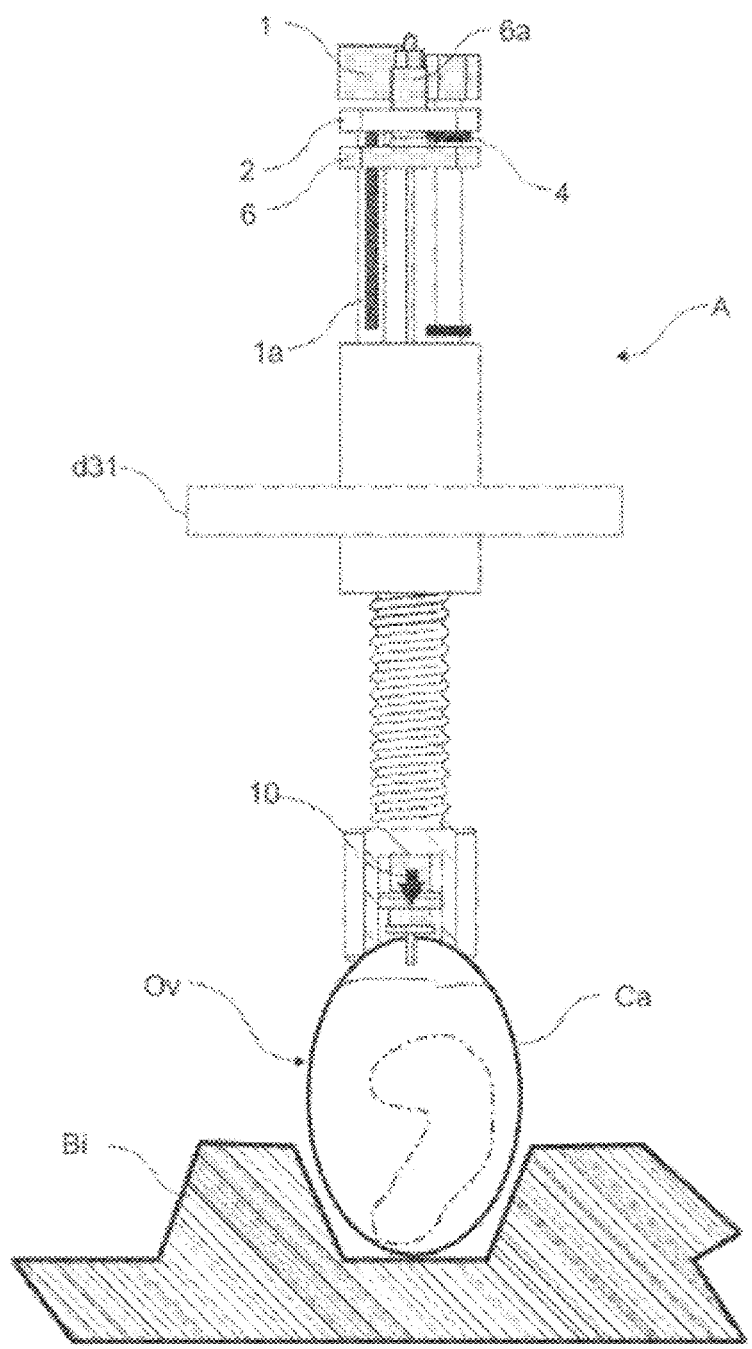
FIG. 12 is an illustrative side view of a unit of the smart injector device in the perforating step of the surface of the fertile egg to be treated.
Figure 13:
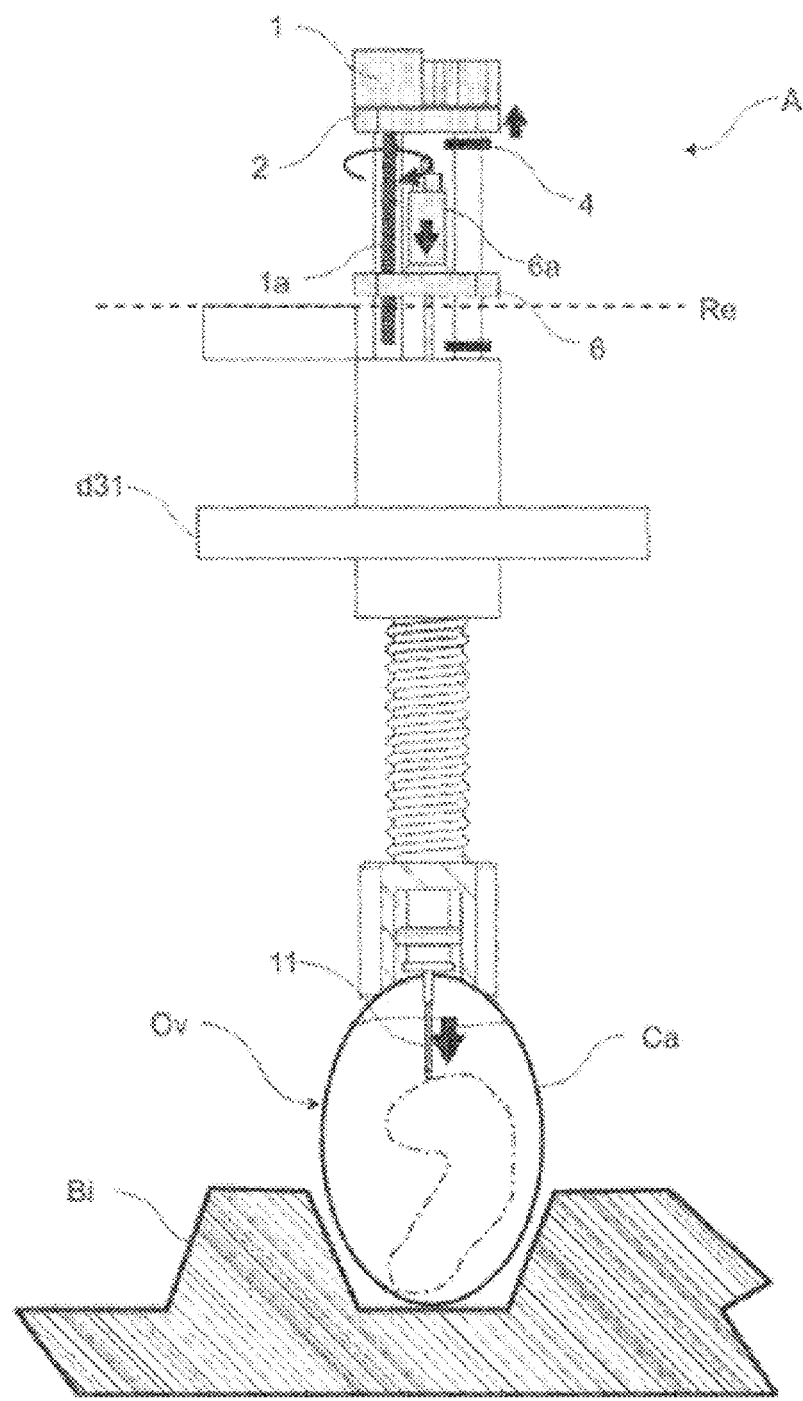
FIG. 13 is an illustrative side view of a unit of the intelligent injector device in the step of controlled advancement of the needle to contact with the embryo.
Figure 14:
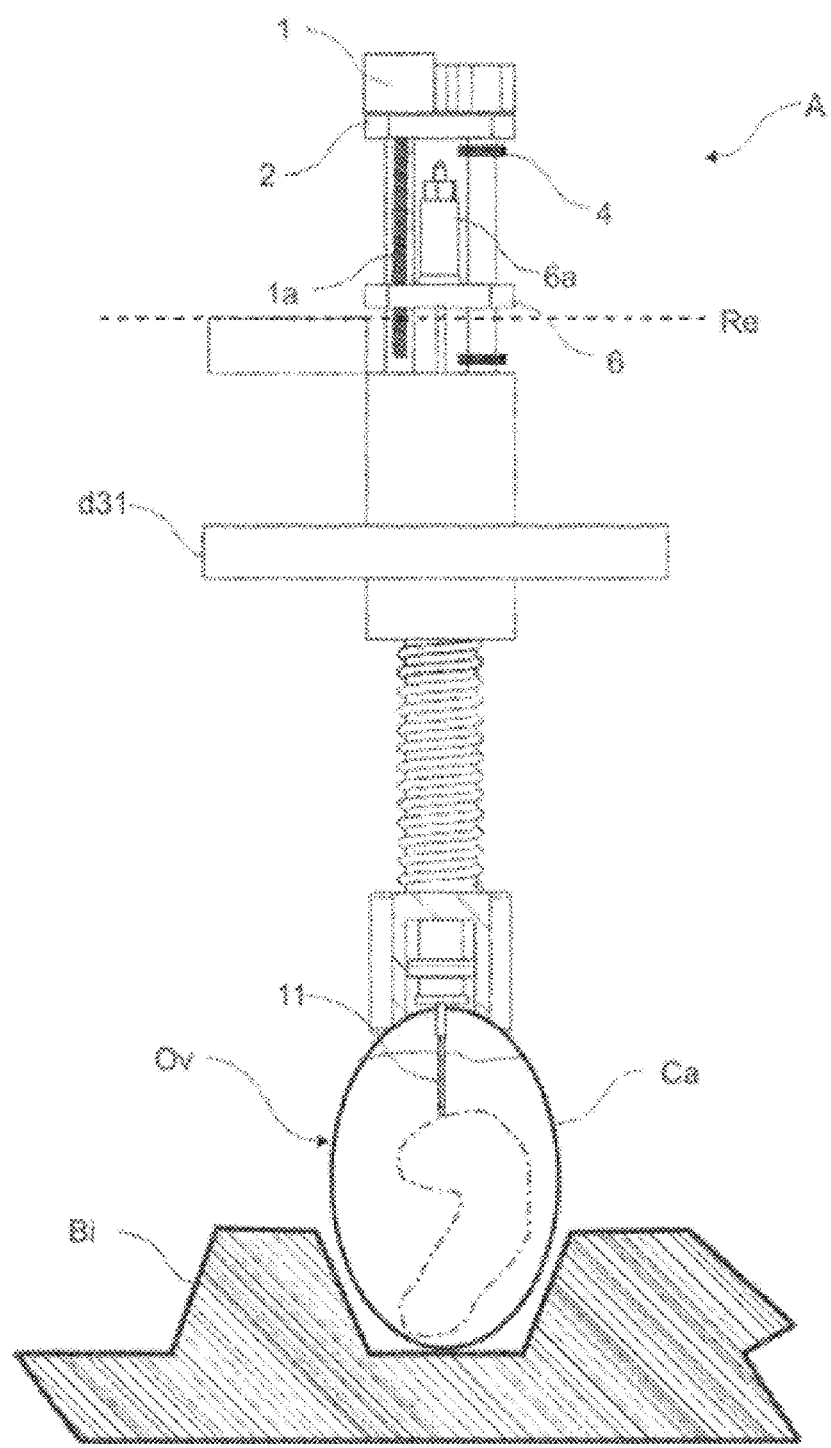
FIG. 14 is an illustrative side view of a unit of the smart injector device in the step of contacting the needle with the embryo.
Figure 15:
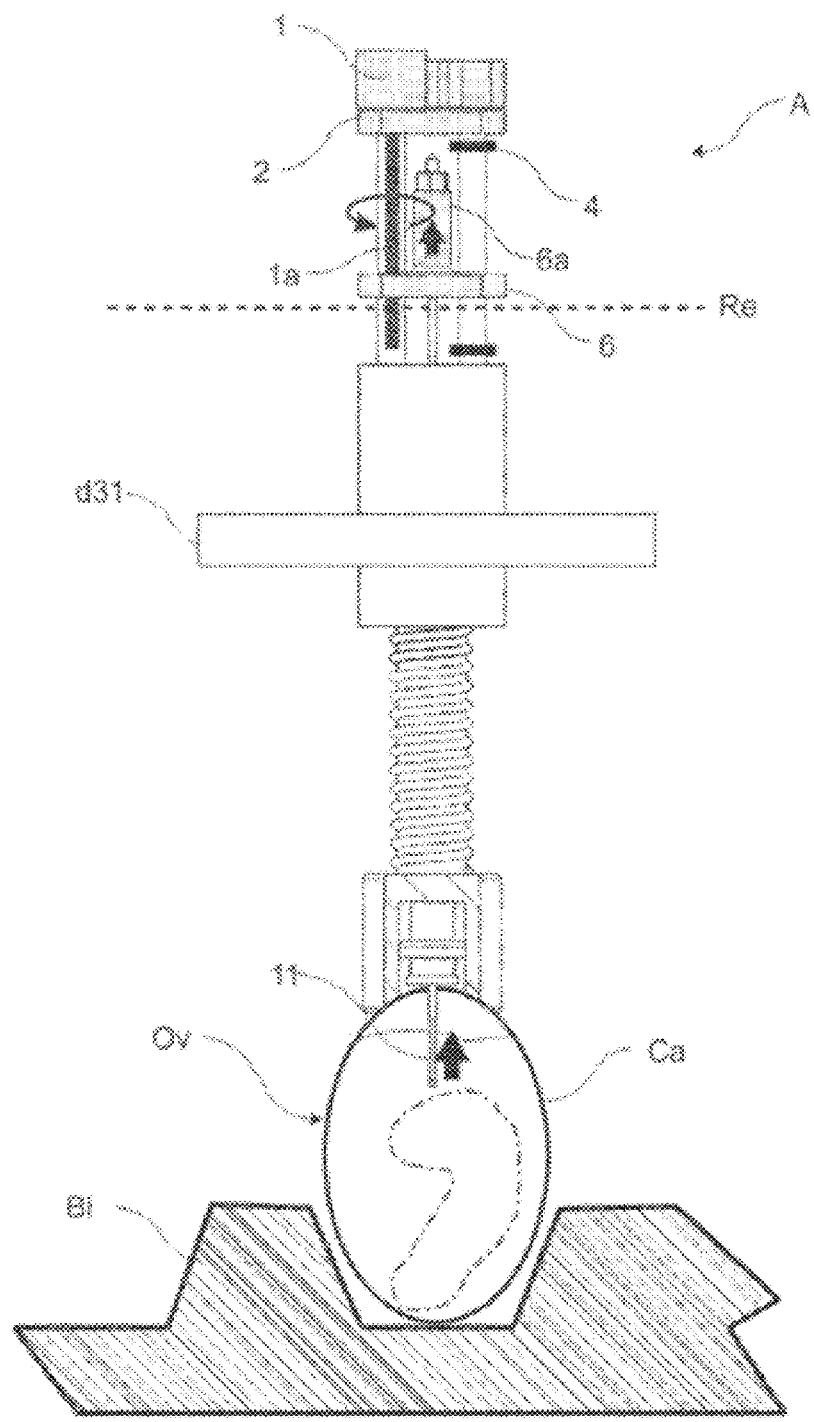
FIG. 15 is an illustrative side view of a unit of the intelligent injector device in the discrete controlled withdrawal step from the needle to the embryo to the point of inoculation.

The motor components 1, platforms 2 and 6 are driven by the PLC (d1), which in turn emits signal in response to the signal by the contact or absence of contact of the sensor (4).

c.1.3. Operational logic: an operational condition will be described considering the inoculation of nutrient or nutritional vaccine complex, ie where the final condition is to inoculate the substance directly into the amniotic fluid (Li), as shown in FIG. 6b.

c1.3.1 Condition where the embryo is touched, considering that the substance to be inoculated is a nutrient or a nutritional vaccine complex, the following kinematics of the intelligent injection device (A) are defined:

Step 1: Initial set up, as shown in FIGS. 10 and 11, where the support platform (d31) descends until the coupling cup (9) touches the upper surface of the fertile egg (Ov), where established (d31) with the aid of the injector stabilizer device (d33) locks the injector (A) in the upright position;

Step 2: Shell perforation (Ca), as evidenced in FIG. 12, where again the support platform (d31), engages downward movement, leading the perforator (10) already in linear motion, towards the bark (Ca), promoting its perforation;

Step 3 Feeding of the needle 11, as evidenced in FIG. 13, wherein the step motor 1 is driven, providing consequent rotational movement of the spindle axis (la) which consequently promotes the downward displacement of the platform (11), wherein the PLC (d1) does the displacement calculation having a reference line (Re) and the number of electrical pulses sent by the stepper motor (1);

Step 4: Encounter of the embryo, as shown in FIG. 13, at the moment when the needle (11) touches the embryo (Em), the embryo mass will show resistance to perforation, causing a counter force on the needle (11) which moves the needle support platform (6) and the needle coupler (6a) upwards, also with consequent displacement upwards of the platform (2) of the stepper motor (1), where this platform (2) no longer has contact with the touch sensor (4), see FIG. 14, where established this condition a signal is sent to the PLC (d1) that understands the encounter of the embryo (Em), and immediately cuts off the power of the step motor (1), interrupting the displacement of the needle (11), see FIG. 14;

Step 5: Retreat for inoculation, as evidenced in FIG. 15, where the PLC (d1) sends a signal for reversal of rotation of the step motor (1), and consequent reversal of rotation of the spindle axis (1a), promoting a discrete displacement of the needle support platform 6 and needle coupler 6a and consequent discreet withdrawal of the needle 11, becoming free in the amniotic fluid (Li).

Figure 16:
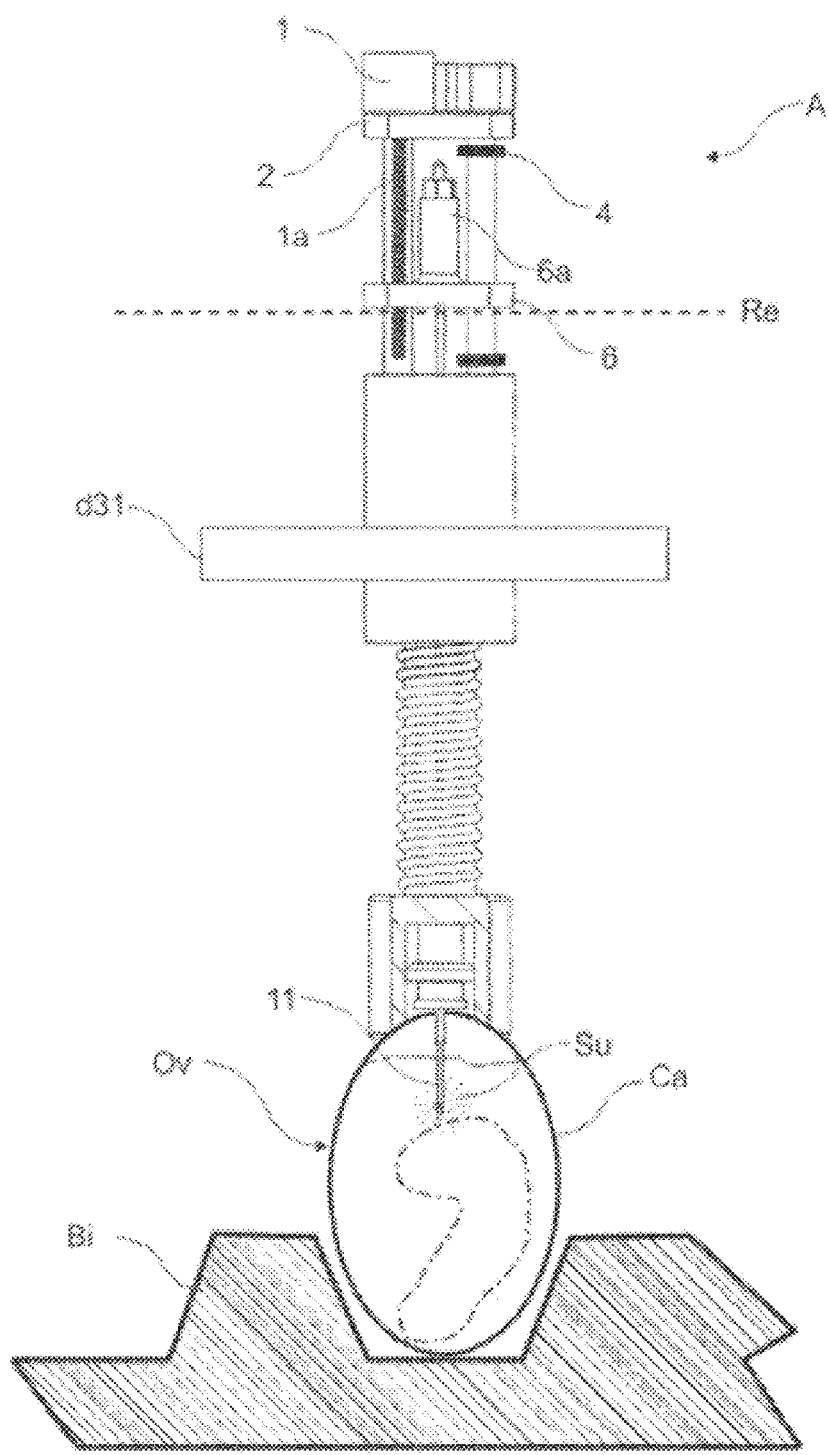
FIG. 16 is an illustrative side view of a unit of the smart injector device in the step of inoculating the substance, in this case a nutritional or nutritional vaccine complex.
Figure 17:
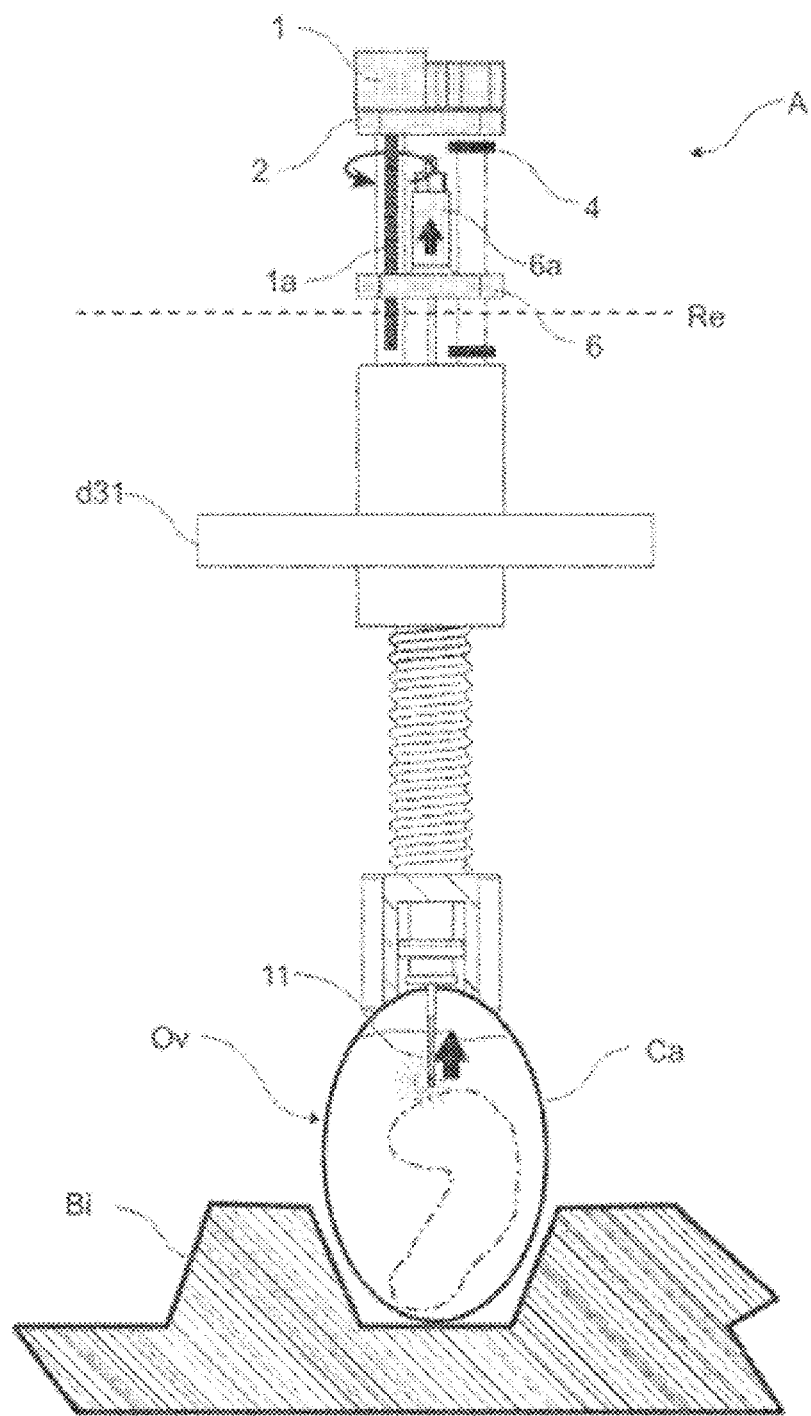
FIG. 17 is an illustrative side view of a unit of the intelligent injector device in the step of full withdrawal of the needle into the injection device.
Figure 20:
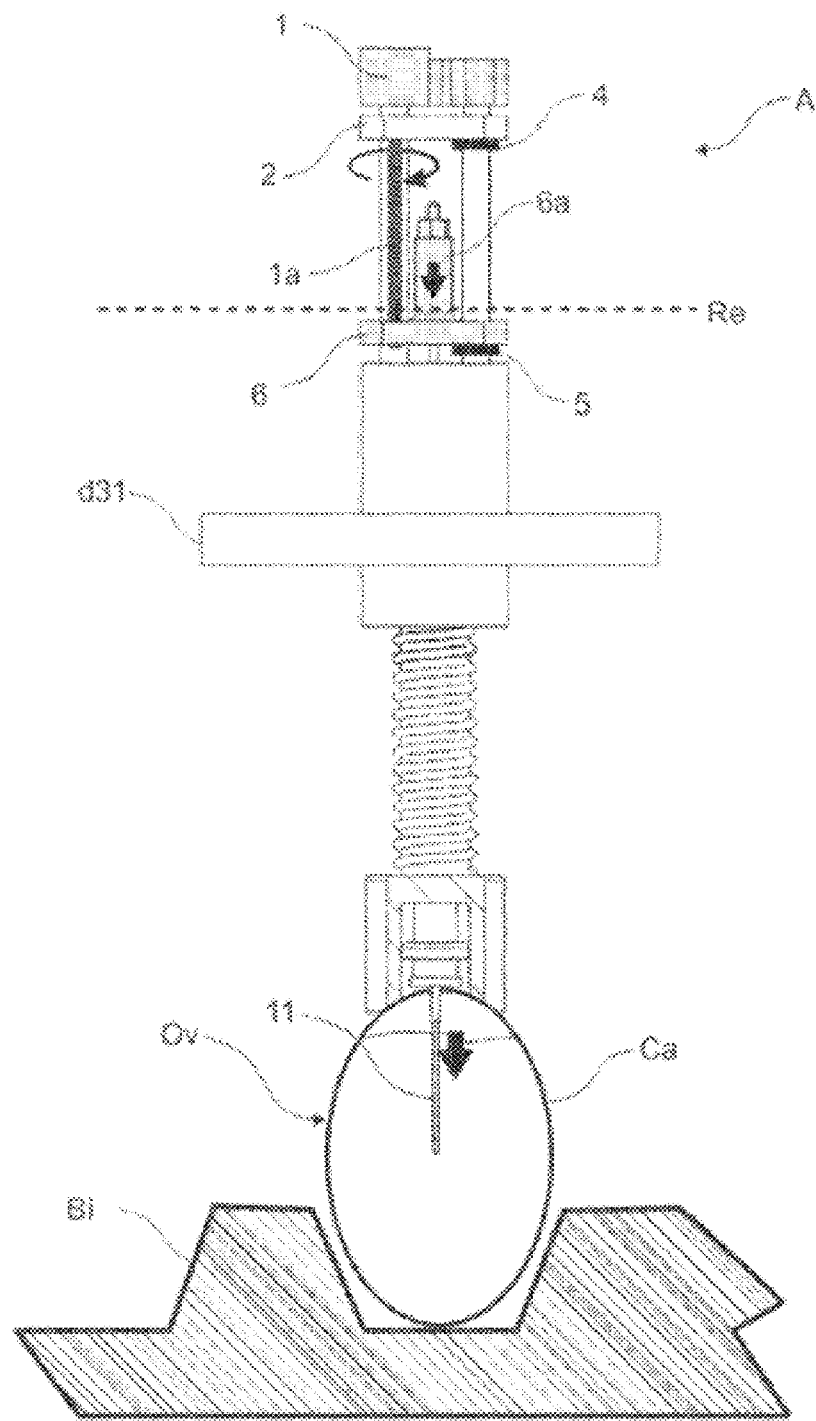
FIG. 20 is an illustrative side view of a unit of the intelligent injector device in the condition of identification of absence of embryo or even absence of the egg itself in the niche of the inoculation tray, thus avoiding the inoculation of substance unnecessarily.
Figure 21:
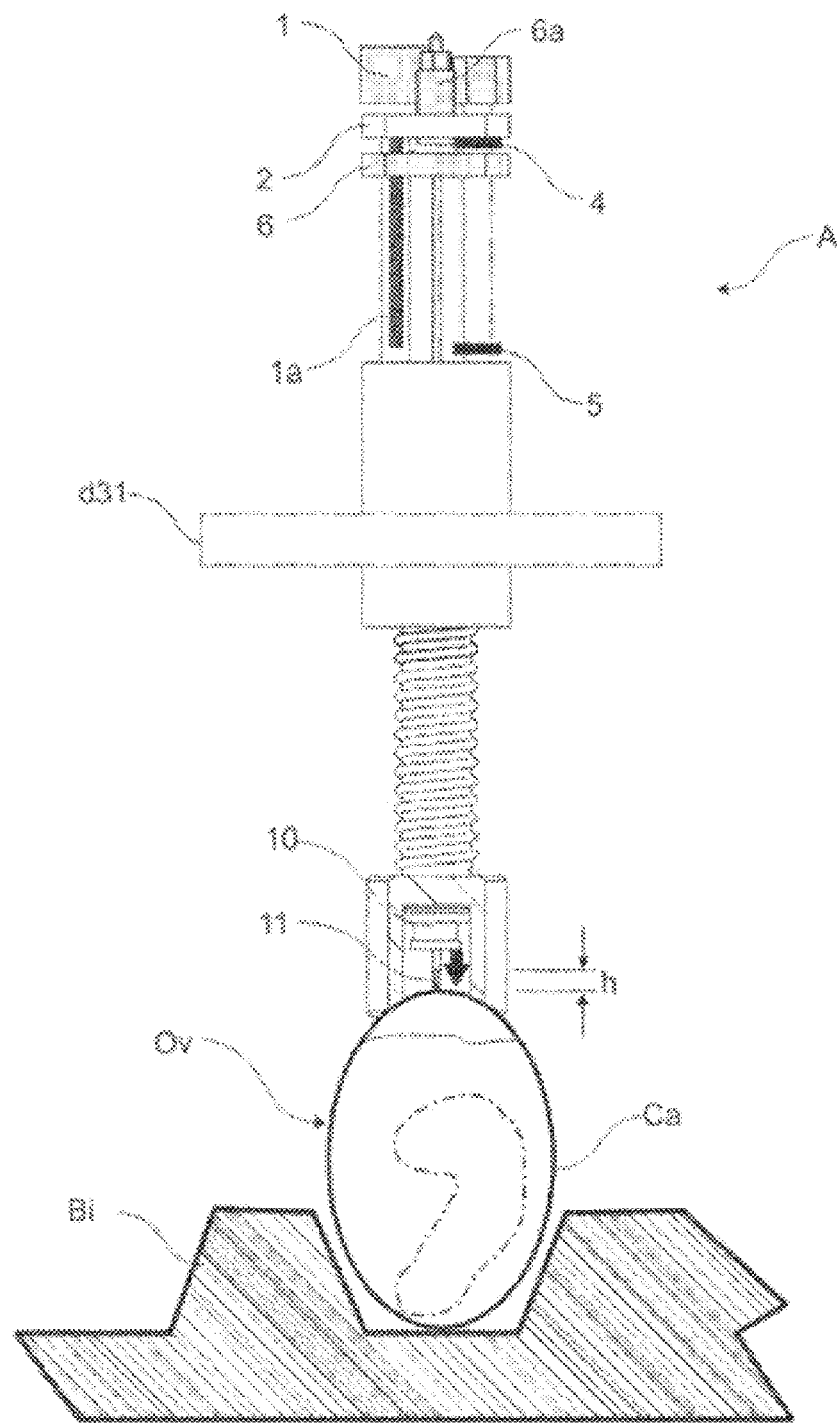
FIG. 21 is an illustrative side view of a unit of the smart substance injector device in a condition where the shell perforator component is not operative and therefore an access hole is not provided in the shell of the egg.
Figure 22:
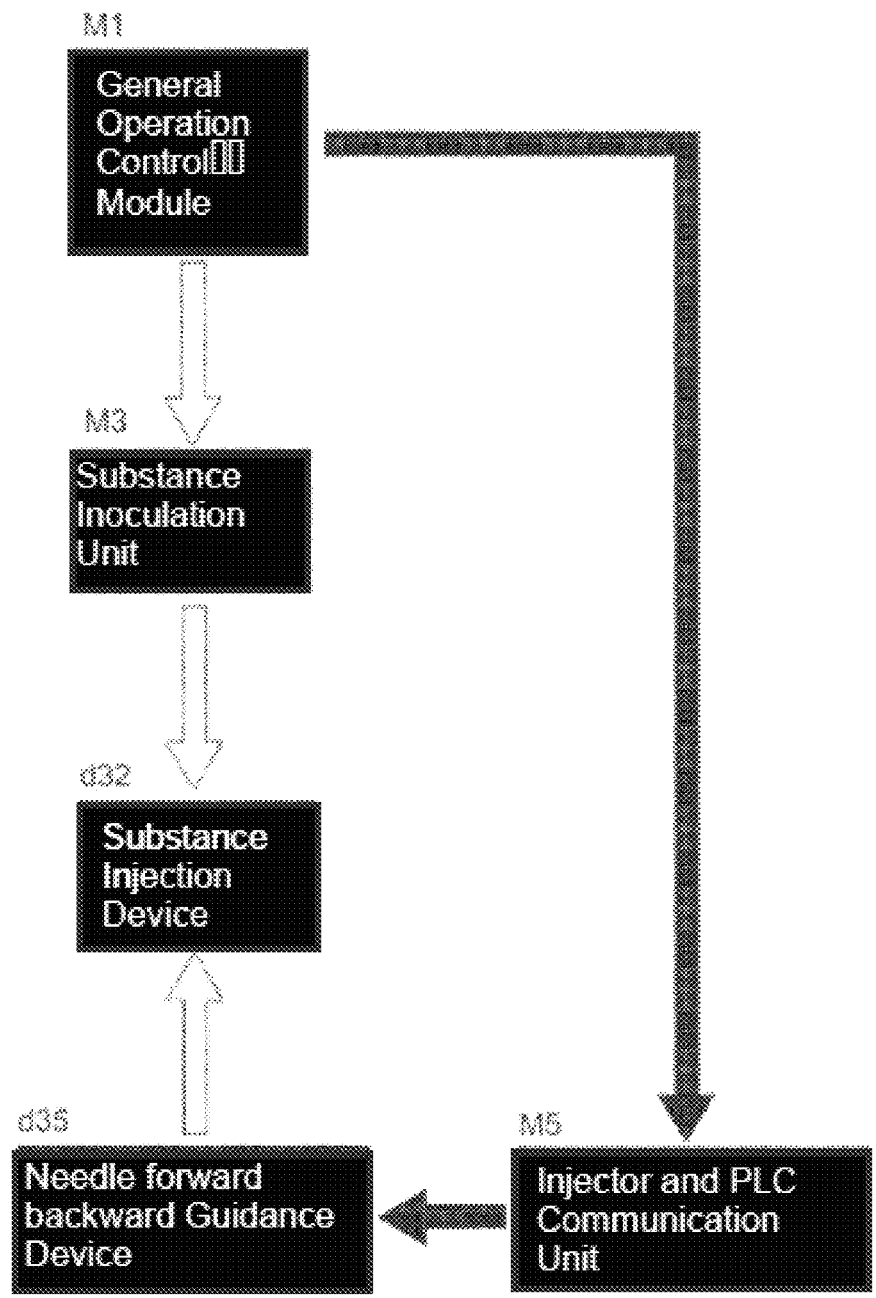
FIG. 22 is a representation in block diagram form, representative of the general architecture of a bird breeding system, evidencing the operational modules of interest, namely the general operational control module and the intrabody inoculation module the latter having defined to the intelligent device injector of substances that has added the device of advance/withdrawal of needles, device that receives the module communicator injectors with PLC.
Figure 23:
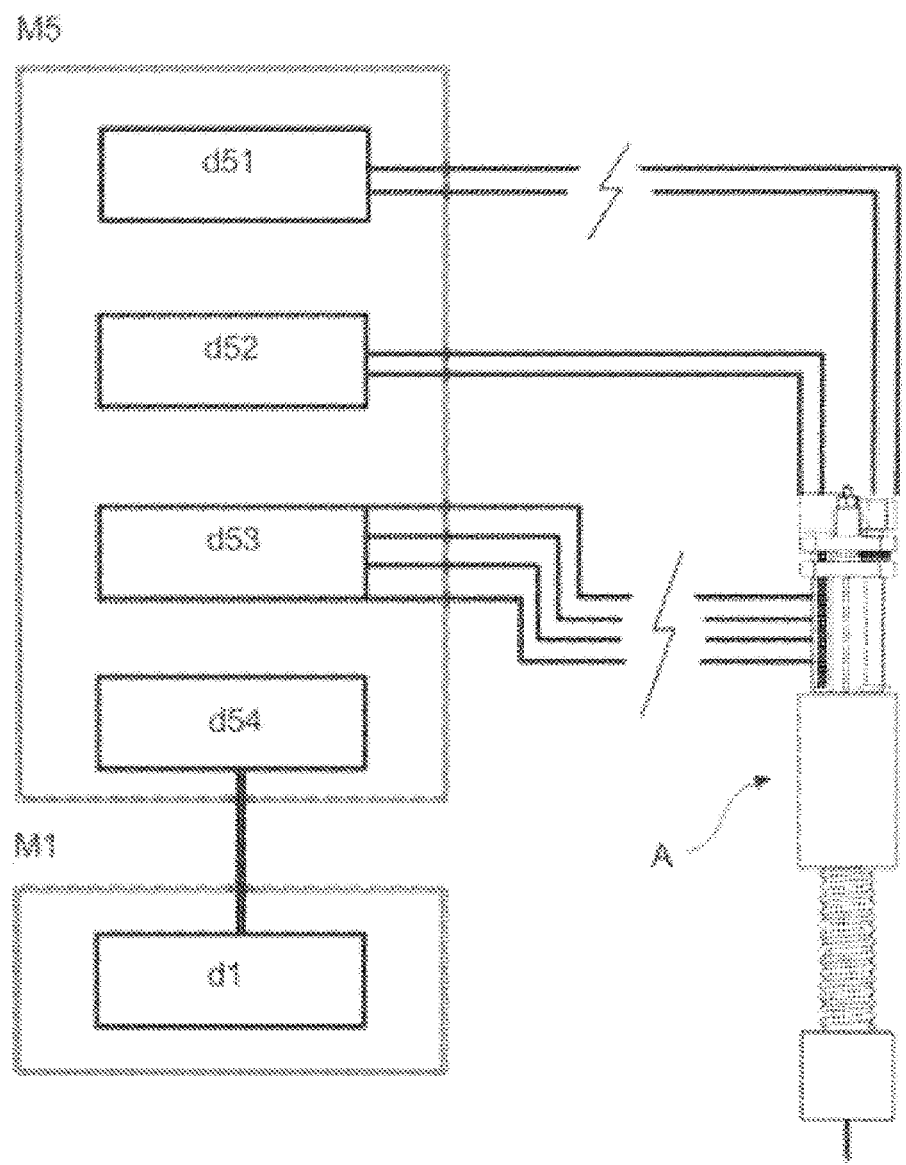
FIG. 23 is an illustrative representation of a first embodiment of the injector communicator module with the PLC, termed conventional with physical connection by cabling, showing its constructivity.

Step 6: Inoculation of the substance, as evidenced in FIG. 16, where the needle (11) is free in the amniotic fluid (Li), the PLC (d1) sends a signal to the injection mechanism of the substance, inoculating it, where for the present example, it is a nutrient or even a nutritional vaccine complex;

Step 7: Full needle retrieval, as evidenced in FIG. 17, where the PLC (d1) sends signal with reversal of rotation of the step motor (1), and consequent reversal of rotation of the spindle axis (1a), promoting a reciprocating movement of the needle support platform 6 and needle coupler 6a and consequent complete withdrawal of the needle 11;

Step 8: Recalculation for initial status, as evidenced in FIG. 18, where the PLC (d1) sends signal to the support platform (d31) which describes upward movement, returning the entire set of the substance inoculation module (m3) to its original position, and distant from the fertile egg (Ov) duly inoculated with nutrient or nutritional vaccine complex, see figure.

c 1.3.2 Condition where the embryo is touched: considering that the substance to be inoculated is a vaccine, the steps are maintained in their entirety: steps 1, 2, 3, 4. 7 and 8, discretely changing Steps .5 and .6, as described below:

Step 5: Advancing for inoculation, where the PLC (d1) sends signal for maintaining the rotation of the step motor (1), and consequently maintaining the rotation of the spindle axis (1a), promoting a discrete downward displacement of the support platform of the needle (6)

and the needle coupler (6a) and consequent discreet advancement of the needle (11), penetrating the embryo, intramuscularly or subcutaneously;

Step 6: Inoculation of the substance, where the needle (11) penetrates the embryo intramuscularly or subcutaneously, PLC (d1) signals the injection mechanism of the substance, inoculating it, where for the present example it treats of a vaccine.

c1.3.3: Condition wherein the embryo is not touched: the intelligent injection device (A) provides for the possibility of not being identified the embryo, which may occur due to a failure in the egg-laying procedure and the inoculation tray (Bi) has been loaded with an unfertilized egg, or even because the fertilized egg does not exist in the corresponding niche of that tray of inoculation (Bi), where to avoid inoculation, vaccine, nutrient or nutritional vaccine complex is unduly or better innocuous, and consequently wasting an input of significant added value, the inoculation system operates with the following logic:

Steps 1 and 2 are repeated in the condition where the embryo is found;

Step 3: Advancing of the needle 11, as evidenced in FIG. 20, wherein the step motor 1 is driven, providing a consequent rotational movement of the spindle axis (1a) which consequently promotes the downward displacement of the needle support platform 6 carries the needle 11, where the PLC (d1) does the displacement calculation having a reference line (Re) and the number of electrical pulses sent by the step motor 1 where the embryo (Em) is not encountered in the vicinity of the reference line (Re), the PLC (d1) maintains the operation signal of the stepper motor (1), wherein the needle support platform (6) discloses downward movement to find the position reference sensor (5), where the PLC (d1) immediately receives that and sends the operational interrupt signal of the step motor (1); Following this step, steps 7 and 8 are repeated and performed when and where the embryo (Em) is found.

c 1.3.4 Egg shell non-drilling condition: as shown in FIG. 21, in which case the drilling step 2 is not performed in full, in which case the driller (10) is damaged or (Ov), and the system proceeds to step 3: Advance of the needle, this describes a minimum displacement (h) until it collides with the shell (Ca) from the egg (Ov). In this condition the shell (Ca) acts as the position sensor (5), where the PLC (d1) recognizes this interference and performs a calculation routine which confronts the position of origin of displacement of the needle (11) with the position (h) of the needle (11), interrupting the operation of the motor (1) and the displacement of the plate (3) and consequent displacement of the needle (11). Thereafter, steps 7 and 8 are performed as if in the condition where the embryo is found, and in addition the PLC (d1) sends a non-conformance alert signal to the human machine interface (HMI).

c.2 Injector module communication system with PLC: as shown in FIG. 22, an injector communicator module with PLC (m5) was designed, which allows communication of the PLC system of the general operational control module (M1) with (d35), the communication of which considers at least two principles: communication by physical cabling or communication by wireless technology, which are described in detail in part of that point.

c.2.1 Communication by Physical Cabling:

c.2.1.1 Constructive concept: as shown in FIG. 23, the injector communication module with the PLC (M5) in the form of a macro panel is mounted adjacent to the general operational control module (M1), being composed of the following components:

12V power supply (d51), connected via wiring (Ca51) to the body of the smart injector device (A);

Digital input card (d52) connected by cabling (Ca52) to the sensors, specifically the touch sensor and the position sensor of the smart injector device (A);

Control driver (d53) connected via wiring (Ca53) to the step motor (1) of the smart injector device (A); and A network adapter (d54).

All components of the injector communication module with the PLC (M5) are also individually connected by physical cabling (Ca54) to the PLC (d1) of the operational control module (M1).

c.2.1.2 Operational concept: as shown in FIG. 23, the control drive (d53) is driven by the PLC (d1) and sends the needle drive/retreat device motor drive information (d35), promoting intra-egg displacement of the needle (11) of the smart injector device (A), where the displacement travel is dictated by the solidary operation of the touch sensor (4) and the position sensor 5 also of the smart injector device A, see FIG. 8, which sends the shift stop message to the digital input card (d52) which in turn sends the signal to the PLC (d1) which in turn sends signal for shutdown of the step motor (1), where this operation requires a wire harness totalling 8 tracks.

Although this constructive configuration is feasible from the functional point of view, it presents as a restriction the fact that the control drivers (d53) are external to the injector, which in considering the need for a driver (d53) for each injector (A) generates a very large structure for the communication system as a whole, which helps to hamper the installation operation in the PLC transition (d1) and substance inoculation module (m3), where this situation will be repeated whenever there is a need for replacement of intelligent injector device units (A).

Figure 24:
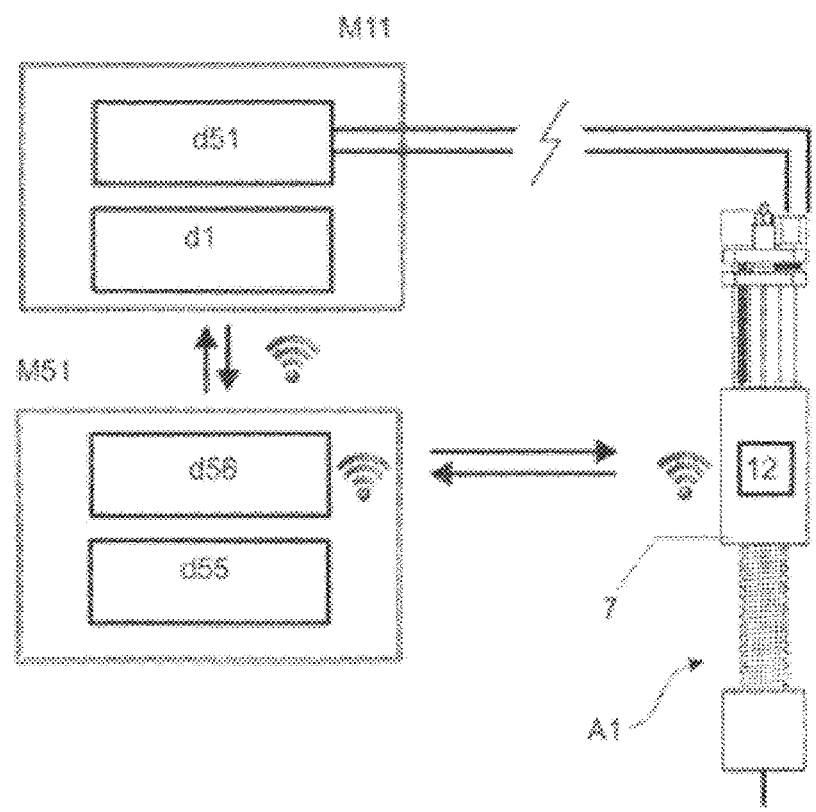
FIG. 24 is an illustrative representation of a second embodiment of the injector communicator module with the PLC, termed conventional with wireless connection evidencing its constructivity.

Finally, in the form of communication with physical cabling, the need for a large control structure (driver's) and specific wiring makes it necessary to design a complete equipment with a large control structure, making it practically impossible to adapt it to equipment pre-existing, resulting in a slow and costly implementation by the company that will exploit the intra-egg vaccination and nutrition market. As will be appreciated, while this embodiment of the injector communicating module with the PLC (m5) is feasible and technically effective, it fails to meet all the objectives previously listed in the topic of the Invention Proposal.

c.2.2 Wireless Communication:

c.2.2.1 Constructive concept: As shown in FIG. 24, the injector communication module with the PLC (M51), in the form of a micro-panel, communicates remotely with the general operational control module (Mi1) and with the Smart Injector Device (A1).

The general operational control module (Thousand) is presented in the form of a compact panel composed of the following components:

12V power supply (d51), connected via the head of the intelligent injector device (A); and PLC (d1), for general control of the substance inoculation equipment.

The injectors communication module with the PLC (M51) is also defined in a compact form composed of the following components:

Dedicated PLC (d55): deals with a PLC dedicated exclusively to the needle advancing/retracting device defining the smart injector device (A1); and Wireless router (d56): responsible for remote communication with the general PLC (d1) of the substance inoculation equipment and with the driver (12) installed in the body (7) of the intelligent injector device (A1).

Figure 25:
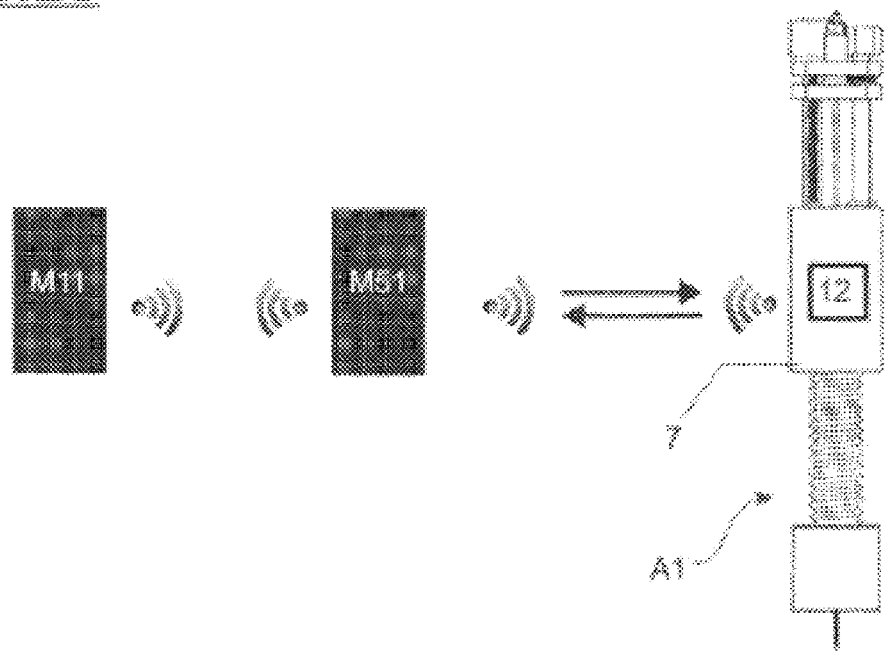
FIGS. 25 is a block diagram representation of the wireless communicator device, evidencing its components, which is applied to the intelligent injection device body.
Figure 26:
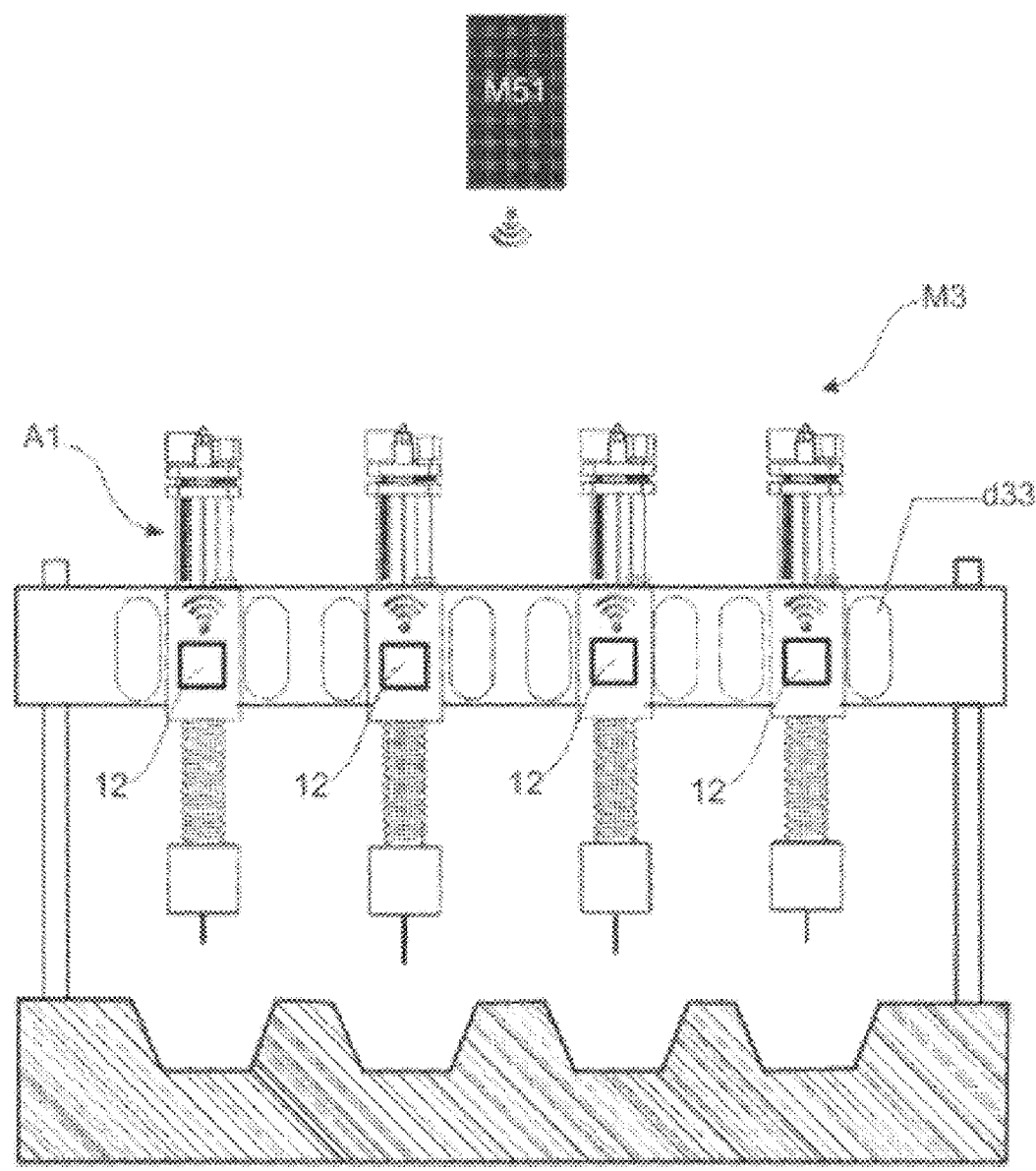
FIGS. 26 is an illustrative representation of a second embodiment of the injector communicator module with the PLC, called a wireless connection, showing its simplicity of installation for all intelligent injection devices.

Lastly, the intelligent injector device (A1) has its constructive and operational concept identical to that described for the smart injector device (A), see FIGS. 7, 8 and 9 wherein a wireless communicator device (12), composed, for example, of a WIFI controller (12a) which has the function of activating the driver (12b), see FIGS. 24, 25 and 26, which in turn has an operational management function (on/off) of the stepper motor (1) defined in the needle advance/withdrawal module remotely through signal of the wireless router (d56), see FIG. 24, providing the needle displacement (11) of the smart injector device (A1).

c.2.2.2 Operational concept: The wireless router (d56) of the injector communication module with the PLC (M51) sends signal to the WIFI controller (12a) of the attached wireless communicator device (12) to the body (7) of the smart injector device (A1), which activates the drive (12b) which in turn promotes the actuation of the step motor (1) of the needle advancing/displacing device (d35), with consequent intra-egg of the smart injector device (A1), where the travel of said displacement is dictated by the solid operation of the touch sensor (4) and the position sensor (5) also provided in the smart injector device (A1), wherein the end of the needle stroke is recognized by the driver 12b, which information is picked up by the WIFI controller 12a which in turn sends the scroll-stop message to the wireless router (d56), which sends the signal to the PLC (d1) of the general operational control module, which returns signal to the same wireless router d56, which in turn sends signal to WIFI controller 12a, which again sends through the driver 12b the command for shutting down the step motor 1, of the smart injector device (A1).

With the composition of an injection device based on the smart injector (A1) device coupled with a wireless communicator device (12), it becomes practically "plug and play" in its implementation in existing in-ovo vaccination equipment, whereby only conventional injectors are replaced by intelligent injectors (A1) and a mobile panel with a wireless router (d56) of a reduced size compared to conventional vaccination equipment.

Lastly, this second embodiment of the dedicated PLC communication system (d55) and Intelligent Injector (A1), generates great financial savings, as it can also be applied to the PLC communication system with other operating devices, for example, for removal of fertile eggs, handling, dosing and transfer of eggs.

As it is possible to verify, this second embodiment fully attenuates the roll of previously defined objectives, providing a communication system between the dedicated PLC (d55) and all intelligent (A1) compact injection devices, which minimizes the congestion, as shown in FIG. 26.

The choice of preferred embodiments for the smart injection devices (A) and (A1) and operational control module of the needle guided advance/withdrawal device attached to such smart injection devices, claimed in this carton and described in this detail is provided by way of example only. Modifications, modifications and variations may be made to any other embodiments of such intelligent injection devices (A) and (A1), changes which may be devised by those skilled in the art without, however, departing from the objective disclosed in the claim invention, which is exclusively defined by the appended claims.

It will be seen from what has been described and illustrated that the "OPERATIONAL CONTROL MODULE FOR THE NEEDLE ADVANCE/WITHDRAWAL DEVICE COMBINED WITH A SMART SUBSTANCE INJECTOR DEVICE FOR SUBSTANCE INOCULATION INTO FERTILIZED EGGS AND INTELLIGENT SUBSTANCE INOCULATION INTO FERTILIZED EGGS" are in accordance with the rules governing the invention patent in light of the Industrial Property Law, deserving for which the respective privilege has been disclosed.

What is claimed is:

1. A device for intelligently injecting substance inside a fertilized egg comprising:
    an injector body, wherein a lower part of the injector body supports a levelling spring comprising a levelling spring lower end,
        wherein the levelling spring lower end comprises a coupling cup,
        wherein, the interior of the coupling cup comprises a perforator and a needle coupler, and
        wherein the perforator is configured such that a stem of an injection needle passes through the perforator, and;
    an intelligent injection device, comprising a stepper motor, a platform, one or more guide columns, and a needle support platform
        wherein the stepper motor is mounted and affixed on the platform,
        wherein the one or more guide columns pass through the platform and are fixed on an upper part of the injector body,
        wherein a spindle axis is mounted on the injector body perpendicular to a rotor axis
        wherein the stepper motor passes through holes in the platform by the one or more guide columns and further threaded through a threaded hole
        wherein a touch sensor is mounted and fixed on a top of one of the guide columns and immediately below the platform,
        wherein, in the starting position of an inoculation cycle, the touch sensor upper surface receives interference from the lower surface of the platform,
        wherein a position sensor is mounted on a bottom of one of the guide columns,
        wherein the needle support platform is located immediately below the platform, and
        wherein the needle coupler is mounted on the needle support platform and passively mounted by the one or more guide columns and next to the spindle axis through holes in said needle support platform.

2. A process for intelligent injection of a substance using the device according to claim 1, wherein, for a condition where an embryo is touched and where the substance to be inoculated is a nutrient or nutritional vaccine complex, the operational kinematics of the device are defined by the following steps:
    descending the support platform until the coupling cup touches the upper surface of the fertile egg, and locking the device in the vertical position;
    moving the perforator in linear motion towards a shell;
    advancing the injection needle, wherein the stepper motor is activated to provide rotational movement of the spindle axis for downward displacement of the needle support platform and the injection needle, where a Programmable Logic Controller (PLC) calculates the displacement having a reference line and the number of electrical pulses sent by the stepper motor;
    interrupting injection needle displacement at the moment when the injection needle touches the embryo, wherein the mass of the embryo shows resistance to perforation, causing an opposite force next to the injection needle that displaces the support platform of the injection needle and the needle coupler upwardly, with also displacement upward from the stepper motor and the platform, wherein when platform stops having contact with the touch sensor, a signal is sent to the PLC that recognises the embryo encounter;

retreating the injection needle when the PLC sends a signal for inversion of the rotation of the stepper motor, and consequent inversion of the rotation of the spindle axis, thereby promoting a discrete displacement of the needle support platform and needle coupler and the consequent slight retreat of the injection needle, wherein the injection needle becomes free in amniotic fluid;

inoculating the embryo when the injection needle is free in the amniotic fluid, the PLC emits a signal to a substance injection mechanism;

retracting the injection needle when the PLC sends a signal for inversion of rotation of the stepper motor, with an inversion of rotation of the spindle axis to retreat displacement of the needle support platform and the needle coupler; and raising the support platform when the PLC sends a signal to the support platform to provide an upward movement of the support platform, thereby returning the entire device to its original position, and away from the fertile egg inoculated with the nutrient or nutritional vaccine complex.

3. The process for intelligent injection according to claim 2, wherein for a condition where the embryo is not touched, advancement of the needle is characterized by the PLC maintaining the operation signal of the stepper motor, where the needle support platform describes a downward movement until the needle support platform finds the position sensor, whereby immediately after the PLC receives the operation signal, the PLC sends an operational interruption signal to the stepper motor and the injection needle is retracted and the support platform is raised.

4. The process for intelligent injection according to claim 2, wherein for a condition of non-perforation of a shell, advancing of the needle is characterized by the injection needle describing a minimum displacement until it collides with the shell, wherein when the PLC recognizes this interference and the minimum displacement of the needle, the PLC interrupts the stepper motor operation and the displacement of the needle support platform and the consequent displacement of the injection needle, and retracts the injection needle and raises the support platform, immediately sends a non-conformity warning signal to a human machine interface.

5. An operating control module for needle guidance in the device according to claim 1, wherein an alternative communication module of the injectors with the PLC uses a wired communication, comprising a 12V power supply connected via a first cabling to the body of the device, a digital input card connected by a second cabling to the touch sensor and the position sensor of the device, a control driver connected via a third cabling to the stepper motor of the device and a network adapter, with all components individually connected by physical cabling to the PLC of the operational control module.

6. The operating control module according to claim 5, wherein the PLC activates a control drive of the operational control module that sends an activation command to the stepper motor of the injection needle guided advance/retraction device, promoting the intra-egg displacement of the injection needle of the device, where the course of the displacement is dictated by the solidary operation of the touch sensor and the position sensor as well as the device that sends the travel stop message to the digital input card that sends the signal to the PLC, which in turn sends a new signal to the control drive to stop the stepper motor.

7. A process for intelligent injection of a substance using the device according to claim 1, wherein for a condition where an embryo is touched and where the substance to be inoculated is a vaccine, the operational kinematics of the device according to claim 1 are defined by the following steps:

descending the support until the coupling cup touches the upper surface of the fertile egg, and locking the device the vertical position;

moving the perforator in linear motion towards a shell;

advancing the injection needle, wherein the stepper motor is activated to provide a rotational movement of the spindle axis for downward displacement of the needle support platform and the injection needle, where a Programmable Logic Controller (PLC calculates the displacement having a reference line and the number of electrical pulses sent by the stepper motor;

interrupting injection needle displacement at the moment when the injection needle touches the embryo, wherein the mass of the embryo shows resistance to perforation, causing an opposite force next to the injection needle that displaces the support platform of the injection needle and the needle coupler upwardly, with also displacement upward from the stepper motor and the platform, wherein when platform stops having contact with the touch sensor, a signal is sent to the PLC that recognises the embryo encounter;

penetrating the embryo when the PLC sends a signal for maintaining rotation of the stepper motor, and consequent maintenance of the rotation of the spindle axis, thereby promoting a slight and/or discrete downward displacement of the needle support platform and the needle coupler and the consequent slight and/or discrete downward displacement of the needle, the embryo is penetrated intramuscularly or subcutaneously;

inoculating the embryo when the injection needle penetrates the embryo and the PLC signals the injection mechanism of the substance;

retracting the injection needle when the PLC sends a signal for inversion of rotation of the stepper motor, with an inversion of rotation of the spindle axis to retreat displacement of the needle support platform and the needle coupler; and raising the support platform when the PLC sends a signal to the support platform to provide an upward movement of the support platform, thereby returning the entire device to its original position, and away from the fertile egg inoculated with the vaccine.

8. The process for intelligent injection according to claim 7, wherein for a condition where the embryo is not touched, advancement of the needle is characterized by the PLC maintaining the operation signal of the stepper motor, where the needle support platform describes a downward movement until the needle support platform finds the position sensor, whereby immediately after the PLC receives the operation signal, the PLC sends an operational interruption signal to the stepper motor and the injection needle is retracted and the support platform is raised.

9. The process for intelligent injection according to claim 7, wherein for a condition of non-perforation of a shell, advancing of the needle is characterized by the injection needle describing a minimum displacement until it collides with the shell, wherein when the PLC recognizes this interference and the minimum displacement of the needle, the PLC interrupts the stepper motor operation and the displacement of the needle support platform and the consequent displacement of the injection needle, and retracts the injection needle and raises the support platform, immediately sends a non-conformity warning signal to a human machine interface.

\* \* \* \* \*